United States Patent [19]
Imai et al.

[11] Patent Number: 5,870,467
[45] Date of Patent: Feb. 9, 1999

[54] METHOD AND APPARATUS FOR DATA INPUT/OUTPUT MANAGEMENT SUITABLE FOR PROTECTION OF ELECTRONIC WRITING DATA

[75] Inventors: Toru Imai; Hideki Yoshida, both of Kanagawa-ken; Hideo Segawa, Tokyo, all of Japan

[73] Assignee: Kabushiki Kaisha Toshiba, Kawasaki, Japan

[21] Appl. No.: 528,881

[22] Filed: Sep. 15, 1995

[30] Foreign Application Priority Data

Sep. 16, 1994 [JP] Japan .................................. 6-221235
Sep. 16, 1994 [JP] Japan .................................. 6-221238

[51] Int. Cl.$^6$ ............................ H04K 1/00; G06F 12/14; H04B 3/20
[52] U.S. Cl. ......................... 380/4; 380/25; 395/188.01; 364/286.5; 364/DIG. 1
[58] Field of Search ................................ 380/3, 4, 23, 25; 364/246.9, 969.4, 246.6, 260.81, 286.4, 286.5, 286.6; 395/188.01

[56] References Cited

U.S. PATENT DOCUMENTS

| | | |
|---|---|---|
| 4,796,220 | 1/1989 | Wolfe . |
| 4,947,318 | 8/1990 | Mineo . |
| 5,371,792 | 12/1994 | Asai et al. .................................. 380/3 |
| 5,481,672 | 1/1996 | Okuno et al. . |
| 5,488,410 | 1/1996 | Lieberfarb et al. . |
| 5,563,947 | 10/1996 | Kikinis ........................................ 380/4 |
| 5,652,793 | 7/1997 | Priem et al. ................................ 380/4 |

OTHER PUBLICATIONS

Mori et al., "Superdistribution: the Concept and the Architecture", *The Transactions of the IEICE* 73(7): 1133–1146 (1990).

"Department of Defense Trusted Computer System Evaluation Critieria", U.S. Department of Defense, DoD 5200.28–STD, (1983).

*Primary Examiner*—Stephen C. Buczinski
*Attorney, Agent, or Firm*—Foley & Lardner

[57] ABSTRACT

A data input/output management scheme suitable for protection of electronic writing data. Whether the data entered into the program is a protected data or not is judged, and when it is, at least the identifier for identifying the program is recorded as the protected data input record. Then, a data output is permitted when the identifier for identifying the program is not recorded in the protected data input record, while whether or not to permit a data output is judged according to at least a requested output target when the identifier for identifying the program is recorded in the protected data input record. For the writing data, the application program is authenticated, and the authentication result is stored in correspondence to an identifier for identifying the application program. Then, a request for access to writing data from the application program is permitted when the stored authentication result for the application program indicates a successful authentication for the application program.

46 Claims, 19 Drawing Sheets

| NUMBER FOR INDICATING PROTECTED DATA FILE | |
|---|---|
| DATA FILE ID | 4567 |
| CREATOR ID | 123 |
| DECIPHER KEY NUMBER | 28 |
| ⋮ | ⋮ |

LIST OF PROCESSES TO WHICH PROTECTED DATA ARE INPUTTED

| PERMITTED OUTPUT TARGET |
|---|
| /dev/console |
| /dev/tty $\phi$ |
| /dev/fb |
| /dev/win 1 |
| ⋮ |

LIST OF PROCESSES TO WHICH PROTECTED DATA ARE INPUTTED

LIST OF DATA FILE ID FOR EACH PROCESS

FIG.8

| PERMITTED OUTPUT TARGET | DATA FILE ID |
|---|---|
| /dev/console | all |
| /dev/tty φ | 123, 65 |
| /dev/fb | 0–127 |
| /dev/win 1 | OTHER THAN 0–127 |
| ⋮ | ⋮ |

|  | AUTHENTICATION RESULT |
|---|---|
| APPLICATION PROGRAM-1 | ○ |
| APPLICATION PROGRAM-2 | × |
| ...... | ...... |
| APPLICATION PROGRAM-n | ○ |

FIG.23

| | WRITING DATA-1 | WRITING DATA-2 | ...... | WRITING DATA-m |
|---|---|---|---|---|
| APPLICATION PROGRAM-1 | ○ | ○ | ...... | × |
| APPLICATION PROGRAM-2 | × | ○ | ...... | ○ |
| ...... | ...... | ...... | ...... | ...... |
| APPLICATION PROGRAM-n | ○ | × | ...... | × |

METHOD AND APPARATUS FOR DATA INPUT/OUTPUT MANAGEMENT SUITABLE FOR PROTECTION OF ELECTRONIC WRITING DATA

BACKGROUND OF THE INVENTION

1. Field of the Invention

The present invention relates to data input/output management scheme for managing data input according to an input request from a program and data output according to an output request from a program, to protect electronic writing data.

2. Description of the Background Art

An unauthorized duplication of a writing protected by a copyright is prohibited by the copyright law. However, there is a possibility for a malicious person to make an unauthorized duplication of a copyright protected writing illegally because there is no technical measure to prevent such an illegal act. For instance, it is technically impossible to present a copying of a part or a whole of writing data such as book, magazine, newspaper, and database, so that there remains a possibility for an illegal unauthorized duplication to be made despite of a regulation by the law.

In a case the writing data are offered electronically by means of media such as a network, floppy disks, CD-ROMs, etc., this problem of an unauthorized duplication is even more serious. Namely, a copying of the writing data offered in papers has significant drawbacks that it is costly and time consuming, a quality of the data can be deteriorated, and it is impossible to present the data in an arbitrary format. In contrast, a copying of the writing data offered electronically is neither costly nor time consuming, and a quality of the data is hardly deteriorated. In addition, in a case of a digital writing data, a presentation or a partial utilization in an arbitrary format is possible. Thus, an unauthorized duplication can be Just as good as the original in a case of the electronically offered writing data.

Despite of this fact, there has been no technical measure to prevent an authorized duplication of the electronically offered writing data conventionally. For instance, in a case of reading the writing data loaded onto a computer, a writing data application program for reading this writing data and presenting it to a user can also output this writing data to an external port, other process or file, etc., by generating an output request. This is because, once the writing data is given to this program, this program has a freedom as to how to handle this writing data, and there is no means for regulating the operation of this program. For this reason, it is possible for this program to transfer the writing data in its electronically offered format.

Such an undesired transfer of the writing data by the writing data application program can be prevented by refusing all the data output requests from a program at the computer, but this simple-minded measure in turn makes it impossible for every program to be operated on that computer to make any data output at all, so that it causes problems in operating programs other than the writing data application program. In addition, a program issues an output request even in a case of displaying the writing data on a medium such as a display, so that the simple-minded refusal of all the data output requests can create another serious problem that it becomes impossible to display the writing data at all.

In general, for any data not necessarily limited to the writing data, there has been no means for realizing a mechanism to permit a reading of that data but prohibit a generation of a duplication of that data or another data based on that data. In the following, a data for which a reading is permitted by a copying is prohibited will be referred to as a protected data.

Now, when such a protected data is given to a program, this program can write this protected data into a file, output this protected data to an external device through a port, or hand this protected data to another program by means of a communication among processes, so that there is a possibility for a duplication of this protected data to be produced.

Such a duplication of the protected data can be prevented by refusing all the output requests from a program, but this simple minded measure causes a problem in that it is going to make any data output impossible from even a program which has not read the protected data. In addition, when all the output requests are refused, an output of the protected data to a medium such as a display which is incapable of making a duplication is also refused, so that the simple-minded refusal of all the data output requests can create another serious problem that it becomes impossible to display the protected data at all.

Thus, conventionally, it has only been possible to provide a uniform access control to the writing data, and a prohibition of the writing data output can only be realized by prohibiting data output for all the data. In addition, it has conventionally been impossible to realize a sophisticated input/output management for the writing data to permit only a reading of the writing data, or to permit only an output of the writing data to a medium such as a display which is incapable of making a duplication.

On the other hand, a conventional computer system has a security mechanism, by which the management of data such as files is carried out according to the rights set up by a system manager. This type of management is suitable for data for which a specific organization or individual who owns this computer system has rights to carry out operations such as reading, updating, and distributing, etc.

However, in a case of dealing with the writing data such as programs, pictures, novels, etc. on the computer system, the organization or individual who owns this computer system often does not have all rights to carry out all operations on the writing data. For instance, there are cases in which a reading or a utilization is permitted but a updating or a re-distribution is prohibited by the author of the writing data.

In a case of handling such a writing data on a usual computer system, there is a possibility for a malicious system manager to rewrite the access rights for the writing data, or to utilize the writing data improperly under by reading and writing under the right given to the system manager.

In order to prevent such an improper act by a system manager, there is a proposition of a concept called "superdistribution" (R. Mori, et al.: The Transactions Of The IEICE, Vol. E73, No. 7, pp. 1133–1146, July 1990) which manages a permission/rejection of a program utilization by a scheme that cannot be interfered even by a system manager. In the "superdistribution" system, a label indicating an author, a utilization/distribution condition, a charging method, etc. is attached to each writing data, and this label cannot be changed by a usual software, so that it is possible to realize the copyright protection for the application programs.

Apart from this "superdistribution", in the OS (Operating System) which is classified as the security level B according to the security level classification for the OS known as "Orange Book" (Department of Defense Trusted Computer System Evaluation Criteria, Department of Defense Standard DoD 5200.28-STD, Library No. S225,711, DoD Computer Security Center, December 1985), it is possible to make a program or user which is permitted to read and write some data to be incapable of handing that data to another program or user which is not permitted to read and write that data, by means of a mechanism called "mandatory protection". By applying this scheme to the writing data, it is also possible to protect a file which contains the data having no program codes.

However, in the conventional writing data management mechanism mentioned above, only programs are subjected to the copyright protection, and there is no mechanism for protecting passive writing data such as pictures, novels, etc. which have no program codes themselves and which are to be utilized by being read into another program.

For instance, even if a copyright label is attached to such a passive writing data for the purpose of protection, it is still possible for a malicious application program which read this passive writing data to manage such a copyright label improperly. Here, an improper management of a copyright label includes a falsification or deletion of a copyright label for the purpose of making a copy of the writing data.

Also, there is a type of writing data which is formed to contain other writing data therein. For instance, in a case of producing a book of paintings by editing images of a plurality of paintings according to a certain theme, there is a need to manage not just a copyright of the produced book of paintings (a secondary writing data) but also a copyright of each original painting (a primary writing data) as well.

Here, in the application program which has a function for producing a book of paintings by editing images of a plurality of paintings as described above, a copyright label to be attached to the secondary writing data should be in conformity with the authors, utilization/distribution conditions, charging methods, etc. of the copyright labels attached to the primary writing data. More specifically, there is a need to attach a copyright label in which all the authors of the primary writing data are included, while only the utilization/distribution conditions commonly permitted in all the primary writing data are permitted, and the charging by each one of the authors will be made properly.

However, when an application program produces such a secondary writing data, there is a possibility for the secondary writing data to be attached with a copyright label which does not respect contents of the copyright labels of the primary writing data, so that there is no guarantee that the application program manages the copyright label in a desired manner as described above in the conventional mechanism.

For this reason, in order to protect the copyright by the conventional mechanism, it is necessary to embed the writing data into the application program in advance, but this scheme has a problem that degrees of freedom in processing as well as a processing speed will be lowered. In addition, it is difficult to modify existing application programs programmed to read the data and operate on the data such that they can also be utilized for carrying out the copyright management, so that there is a need to develop new application programs.

Besides those described above, as a conventional method for protecting the writing data, there is also a method in which a direct reading of the writing data by the application program is not allowed, and the operation with respect to the writing data can be carried out only through the OS. However, in this method, only the processing supported by the OS can be carried out, so that it is impossible to carry out a special processing of the application program. In addition, as the OS is called up in every processing, this method requires a considerable execution time.

On the other hand, in the conventional OS in the security level B, the management by the OS is carried out under the assumption that, when a certain data is given to the application program, data based on that certain data can possibly be written into every file to which data is to be written after that certain data is read by the application. When the writing data management is carried out by such an OS, in the application program which read and write a plurality of writing data one after another, the copyright label of the writing data that had been read up until then at least once will be attached to all the writing data files which are written subsequently, so that there are cases in which the writing data are attached with a totally unrelated copyright label.

SUMMARY OF THE INVENTION

It is therefore an object of the present invention to provide a data input/output management scheme for realizing a sophisticated input/output management to permit only a reading or a displaying on a display device and prohibit a copying for the specified data such as electronic writing data, while enabling normal data output for data other than the specified data.

It is another object of the present invention to provide a data input/output management scheme for realizing a proper management for passive writing data such that the writing data can be operated only by those application programs which are registered as those that can carry out the copyright label management properly.

According to one aspect of the present invention there is provided a data input/output management apparatus, comprising: request reception means for receiving a data input/output request issued from a program along with an identifier for identifying the program; data input means for entering requested data into the program when the data input/output request received by the request reception means is a data input request; protected data judgement means for judging whether the data entered by the data input means is a protected data or not; protected data input recording means for recording at least the identifier for identifying the program, when the data entered by the data input means is judged as the protected data by the protected data judgement means; output permission judgement means for permitting a data output in a case the identifier for identifying the program is not recorded in the protected data input recording means, and judging whether or not to permit a data output according to at least a requested output target in a case the identifier for identifying the program is recorded in the protected data input recording means, when the data input/output request received by the request reception means is a data output request; and data output means for outputting requested data when the data output is permitted by the output permission judgement means.

According to another aspect of the present invention there is provided a method for data input/output management, comprising the steps of: recording at least an identifier for identifying a program in protected data input recording means, when protected data are entered into the program; and permitting a data output in a case the identifier for identifying the program is not recorded in the protected data input recording means, and judging whether or not to permit a data output according to at least a requested output target in a case the identifier identifying the program is recorded in the protected data input recording means, in response to a data output request from the program.

According to another aspect of the present invention there is provided a writing data management apparatus, comprising: authentication means for authenticating an application program; memory means for storing an authentication result obtained by the authentication means in correspondence to an identifier for identifying the application program; and management means for receiving a request for access to writing data from the application program, and permitting the requested access to the writing data when the authentication result for the application program stored in the memory means indicates a success of the authentication by the authentication means.

According to another aspect of the present invention there is provided a data input/output management apparatus, comprising: authentication means for authenticating an application program; memory means for storing an authentication result obtained by the authentication means in correspondence to an identifier for identifying the application program; request reception means for receiving a data input/output request issued from the application program along with the identifier for identifying the application program; data input means for entering requested data into the application program when the data input/output request received by the request reception means is a data input request; protected data judgement means for judging whether the data entered by the data input means is a protected data or not; protected data input recording means for recording at least the identifier for identifying the application program, when the data entered by the data input means is judged as the protected data by the protected data judgement means; output permission judgement means for permitting a data output in a case the authentication result for the application program stored in the memory means indicates a success of the authentication by the authentication means and in a case the identifier for identifying the application program is not recorded in the protected data input recording means, and judging whether or not to permit a data output according to at least a requested output target in a case the identifier for identifying the program is recorded in the protected data input recording means, when the data input/output request received by the request reception means is a data output request; and data output means for outputting requested data when the data output is permitted by the output permission judgement means.

According to another aspect of the present invention there is provided a method for writing data management, comprising the steps of: authenticating an application program; storing an authentication result obtained at the authenticating step in correspondence to an identifier for identifying the application program, in memory means; and receiving a request for access to writing data from the application program, and permitting the requested access to the writing data when the authentication result for the application program stored in the memory means indicates a success of the authentication at the authentication step.

According to another aspect of the present invention there is provided a method for data input/output management, comprising the steps of: authenticating an application program; storing an authentication result obtained at the authenticating step in correspondence to an identifier for identifying the application program, in memory means; recording at least the identifier for identifying the application program in protected data input recording means, when the protected data is entered into the application program; and permitting a data output in a case the authentication result for the application program stored in the memory means indicates a success of the authentication at the authenticating step and in a case the identifier for identifying the application program is not recorded in the protected data input recording means, and judging whether or not to permit a data output according to at least a requested output target in a case the identifier for identifying the program is recorded in the protected data input recording means, in response to a data output request from the application program.

According to another aspect of the present invention there is provided an article of manufacture, comprising: a computer usable medium having computer readable program code means embodied therein for causing a computer to manage data input/output, the computer readable program means including: first computer readable program code means for causing the computer to judge whether data entered into a program is a protected data or not; second computer readable program code means for causing the computer to record at least the identifier for identifying the program, when the data entered into the program is judged as the protected data by the first computer readable program code means; and third computer readable program code means for causing the computer to permit a data output from the program in a case the identifier for identifying the program is not recorded by the second computer readable program code means, and to judge whether or not to permit a data output from the program according to at least a requested output target in a case the identifier for identifying the program is recorded by the second computer readable program code means, when a data output request is received from the program.

According to another aspect of the present invention there is provided an article of manufacture, comprising: a computer usable medium having computer readable program code means embodied therein for causing a computer to manage writing data, the computer readable program means including: first computer readable program code means for causing the computer to authenticate an application program; second computer readable program code means for causing the computer to store an authentication result obtained by the first computer readable program code means in correspondence to an identifier for identifying the application program; and third computer readable program code means for causing the computer to receive a request for access to writing data from the application program, and to permit the requested access to the writing data when the authentication result for the application program stored by the second computer readable program code means indicates a success of the authentication by the first computer readable program code means.

Other features and advantages of the present invention will become apparent from the following description taken in conjunction with the accompanying drawings.

BRIEF DESCRIPTION OF THE DRAWINGS

FIG. 8 is a diagrammatic illustration of data structure used in the permitted output target specifying unit of the apparatus for the second variation on the first embodiment of a data input/output management scheme according to the present invention.

FIG. 23 is a diagrammatic illustration of a management table used in the authentication result memory unit of a system for the seventh variation on the second embodiment of a data input/output management scheme according to the present invention.

DETAILED DESCRIPTION OF THE PREFERRED EMBODIMENTS

Referring now to FIG. 1 to FIG. 4, the first embodiment of a data input/output management scheme according to the present invention will be described in detail.

Figure 1:
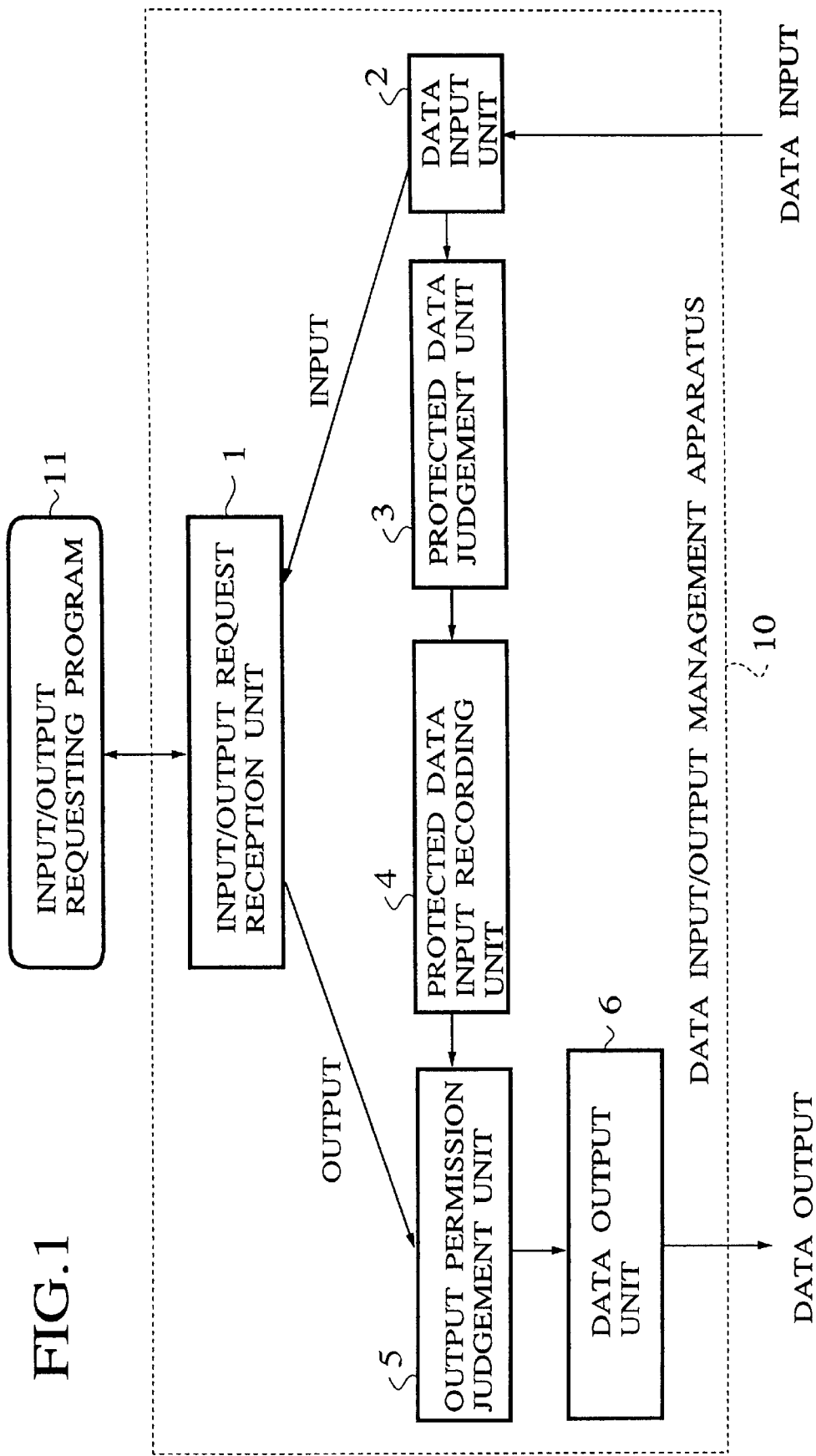
FIG. 1 is a block diagram of an apparatus for the first embodiment of a data input/output management scheme according to the present invention.

In this first embodiment, as shown in FIG. 1, a data input/output management apparatus 10 is provided to control data input and data output to and from an input/output requesting program 11, where the apparatus comprises: an input/output request reception unit 1 for receiving data input/output request from the program 11; a data input unit 2 for entering data input into the program 11 requested via the input/output request reception unit 1; a protected data judgement unit 3 for judging whether each data input entered into the program 11 is a protected data or not; a protected data input recording unit 4 for recording each input of the protected data detected by the protected data judgement unit 3; an output permission judgement unit 5 for judging whether data output from the program 11 requested via the input/output request reception unit 1 is permitted or not according to the input of the protected data recorded in the protected data input recording unit 4; and a data output unit 6 for outputting data output from the program 11 which is judged to be permitted by the output permission judgement unit 5.

Now, this data input/output management apparatus 10 of FIG. 1 operates according to the flow chart of FIG. 2 as follows.

When the input/output requesting program 11 issues a request for data input/output, the input/output request reception unit 1 receives this request, and judges an ID of the requesting program 11 and a type of the received request, i.e., whether it is a data input request or a data output request (step S21).

Usually, the OS has an internal program for receiving a system call from a process and judging a type of the received system call, and the operation of the step S21 by the input/output request reception unit 1 corresponds to this usual function. Here, the input/output requesting program 11 may be executed on the same computer in which the input/output request reception unit 1 is operated, or by a different computer. When the requesting program 11 is executed on the same computer, it is possible to use a process ID as an ID of the requesting program 11, whereas when the requesting program 11 is executed on a different computer, it is possible to use a pair of a host ID and a process ID as an ID of the requesting program 11. A type of request is indicated by the input/output requesting program 11 in a prescribed procedure such as a registration of an ID of the request into a specific register at a time of issuing the request, or a transmission of an ID of the request at a top of the request, so that the input/output request reception unit 1 can read and judge the indicated type from the received request (step S22).

When it is judged at the input/output request reception unit 1 that the received request is a data input request at the step S22, the data input unit 2 enters the requested data (step S23). Here, when the data are stored in a recording medium such as disk, CD-ROM, tape, etc., the data input unit 2 reads out the requested data from such a recording medium. It is also possible for the data input unit 2 to read the data from a non-storage type medium such as a network. What is known as a device driver in the OS corresponds to this function of the data input unit 2.

The protected data judgement unit 3 then judges whether the requested input data is a protected data or not (step S24).

Here, in this first embodiment, it is assumed that the data to be entered by the data input unit 2 are stored as files in a recording medium and a file which contains a protected data has a prescribed header format. Consequently, the protected data judgement unit 3 can judge each data as a protected data if the entered file has that prescribed header format, or as non-protected data otherwise. This prescribed header format may be recorded in the protected data judgement unit 3 in advance, or recorded in another file which is to be referred by the protected data judgement unit 3, or managed by another program which notifies it to the protected data judgement unit 3.

Alternatively, it is equally possible to utilize other judgement schemes. Namely, instead of attaching an information for judging whether a protected data is contained in a file or not to a file itself, whether it is a protected data or not may be judged according to a name of a file in which data is contained, or according to a recorded position in the recording medium.

Figures 3, 4:
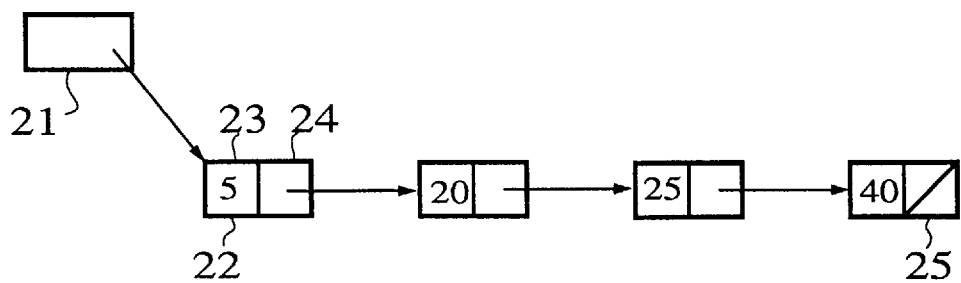
FIG. 3 is a diagrammatic illustration of a header format for the protected data file used in the apparatus of FIG. 1.
FIG. 4 is a diagrammatic illustration of a list of processes used in the protected data input recording unit of the apparatus of FIG. 1.

An exemplary header format for a file containing a protected data in this first embodiment is shown in FIG. 3, which is assumed here to be a prescribed one for a file containing a protected data such that whenever a file has a header in this format, the data contained in that file are the protected data, while the data contained in a file which does not have a header in this format are not the protected data. This header format of FIG. 3 includes fields for a number for indicating that it is a protected data file which contains the protected data, a data file ID for identifying this data file, a creator ID for identifying a creator of this data file, a decipher key number for specifying a key for deciphering the protected data which are enciphered, etc.

Next, if the entered data file is judged as having a prescribed header format for the protected data file (step S24 YES), the protected data input recording unit 4 makes a record for this input of the protected data (step S25). If the entered data file is judged as not having a prescribed header format for the protected data file (step S24 NO), this step S25 is skipped.

Here, in this first embodiment, the protected data input recording unit 4 has an exemplary data structure in a form of a list as shown in FIG. 4, where an ID of the input/output requesting program 11 is recorded in this list of the protected data input recording unit 4 whenever the entered data is judged as the protected data, unless that ID has already been recorded in this list. Thus, in this first embodiment, the IDs of the processes which read at least one protected data are to be recorded in a list structure. For example, in FIG. 4, a process ID "5" is recorded in a field 23 of a list entry 22 pointed by a pointer 21, while a pointer to a next link target is recorded in a field 24 of this list entry 22. When there is no next link target, a data indicating this fact is recorded as in a rightmost list entry 25 in FIG. 4.

Then, the requested data is given to the input/output requesting program 11 (step S26). Here, when the data are enciphered, the data may be deciphered before handing it to the program 11. To this end, it is necessary to provide a deciphering unit (not shown) to which a decipher key number specified in the header and the enciphered data itself are to be given. This function may be realized by software, or by hardware with a higher security level. In a case the input/output requesting program 11 is executed on a different computer, the decipher key and the enciphered data may be handed over to the program 11 side such that the enciphered data can be deciphered at that different computer on which the program 11 is executed.

On the other hand, when it is judged at the input/output request reception unit 1 that the received request is a data output request at the step S22, the output permission judgement unit 5 checks whether the ID of the input/output requesting program 11 which issued this data output request is recorded in the protected data input recording unit 4 or not (step S27). If not, it implies that this input/output requesting program 11 has not read any protected data, so that there is no possibility for the protected data to be outputted, and consequently this data output request can be judged as permitted (step S28).

In contrast, when the ID of the input/output requesting program 11 is recorded in the protected data input recording unit 4, it implies that this is a program which has read the protected data, so that whether this data output request is to be permitted or not is judged according to a requested output target (step S29). Then, when the requested output target is an output device such as a display device from which the data cannot be directly read by another program, the data output request can be judged as permitted (step S30), whereas otherwise there is a possibility for the protected data to be duplicated, so that the requested data output is refused (step S31).

When the requested data output is permitted, the data output unit 6 outputs the requested data to the specified output target (step S32).

Thus, according to this first embodiment, it is possible for a program which has not read any protected data to output any data freely, while for a program which has read at least one protected data, a data output is permitted only for an output target of a transient nature such as a display device and a data output to any other output target can be prohibited. As a result, it is possible to eliminate any possibility for the protected data to be duplicated, without unnecessarily limiting a freedom for data output from any program which has not read any protected data.

Figure 5:
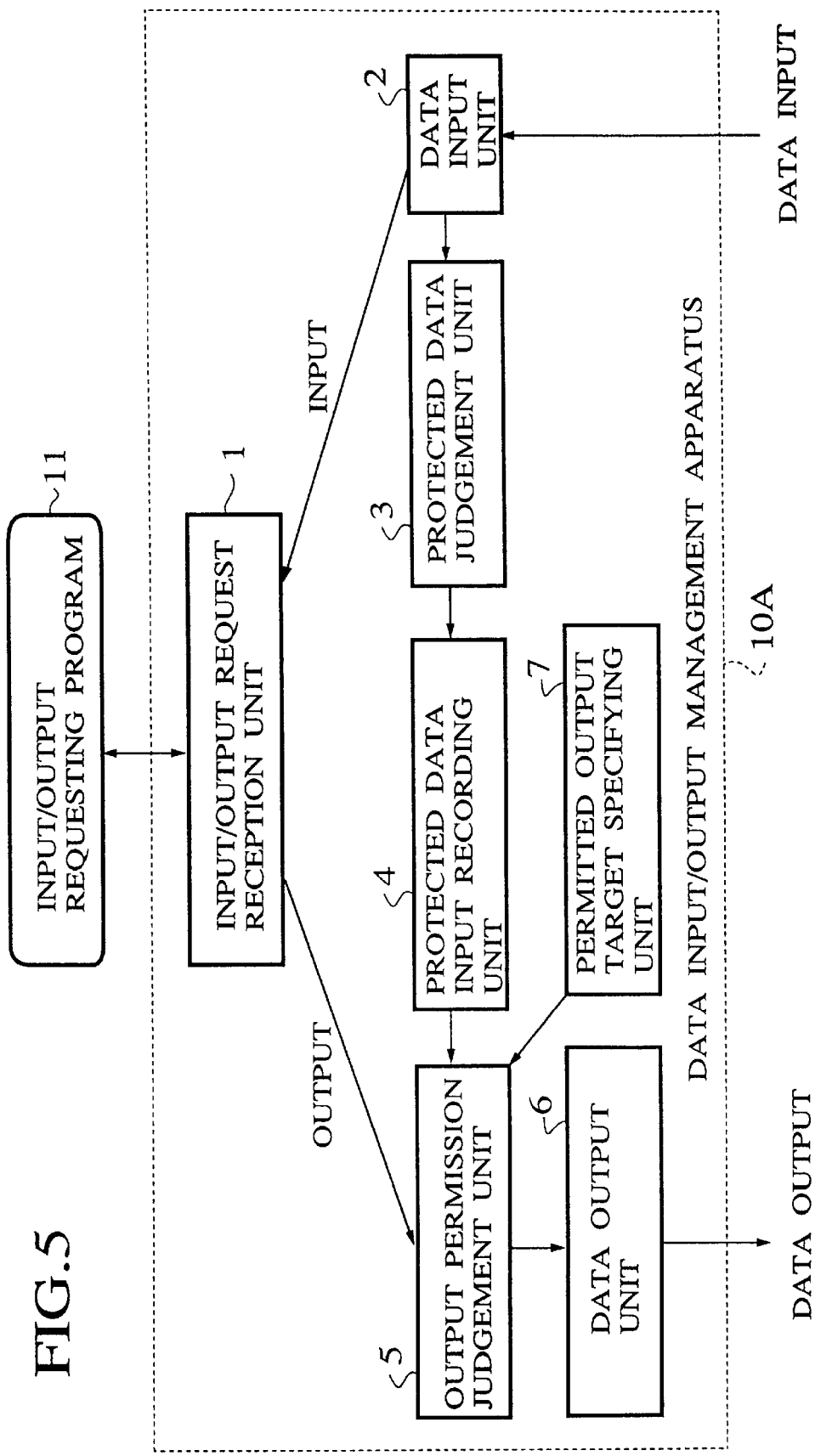
FIG. 5 is a block diagram of an apparatus for the first variation on the first embodiment of a data input/output management scheme according to the present invention.
Figure 6:
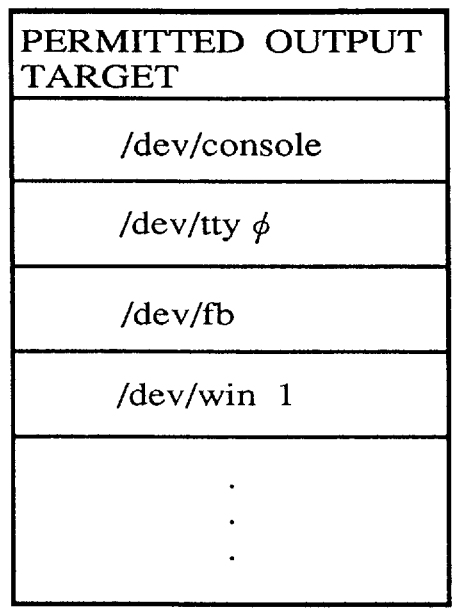
FIG. 6 is a diagrammatic illustration of data structure used in the permitted output target specifying unit of the apparatus of FIG. 5.

Referring now to FIG. 5 and FIG. 6, the first variation of the above described first embodiment of a data input/output management scheme according to the present invention will be described in detail.

Namely, in the first embodiment described above, the output permission judgement unit 5 judges whether the requested data output is permitted or not by judging whether the requested output target is a display device or not in a case the ID of the input/output requesting program 11 is recorded in the protected data input recording unit 4. However, there are cases in which it is more convenient not to limit the permitted output target to a specific one. For instance, when a computer has a plurality of display devices, it may not necessarily be desirable to permit an output of the protected data to any of these display devices. Also, there may be a case in which it is desirable to permit an output of the protected data to a specific device other than the display device. For this reason, this first variation makes it possible to specify the permitted output target of the protected data such that the permitted output target of the protected data can be changed whenever appropriate.

More specifically, as shown in FIG. 5, the data input/output management apparatus 10A of this first variation has a permitted output target specifying unit 7 connected to the output permission judgement unit 5, in addition to the configuration of FIG. 1 described above. Here, the output permission judgement unit 5 refers to the protected data input recording unit 4 as well as the permitted output target specifying unit 7 in judging whether the requested data output is permitted or not.

The permitted output target specifying unit 7 has an exemplary data structure as shown in FIG. 6, in a form of a table of output targets for which an output of the protected data is to be permitted. The output permission judgement unit 5 judges the data output from the program which has read at least one protected data as permitted if the requested output target is contained in this table, whereas otherwise the requested data output is refused.

In a table shown in FIG. 6, each permitted output target is specified by a virtual name of a device such as "/dev/console" by which the OS manages devices, but it is not necessarily limited to this manner, and it is equally possible to specify each permitted output target by means of an identifier which can uniquely specify each output target, such as a port number for example.

It is noted that this permitted output target table should be maintained at a high security level, by managing it under the OS for example, as there arises a possibility for the protected data to be duplicated if this table is modified improperly.

Thus, according to this first variation, it also becomes possible to change the permitted output target of the protected data appropriately.

Figure 7:
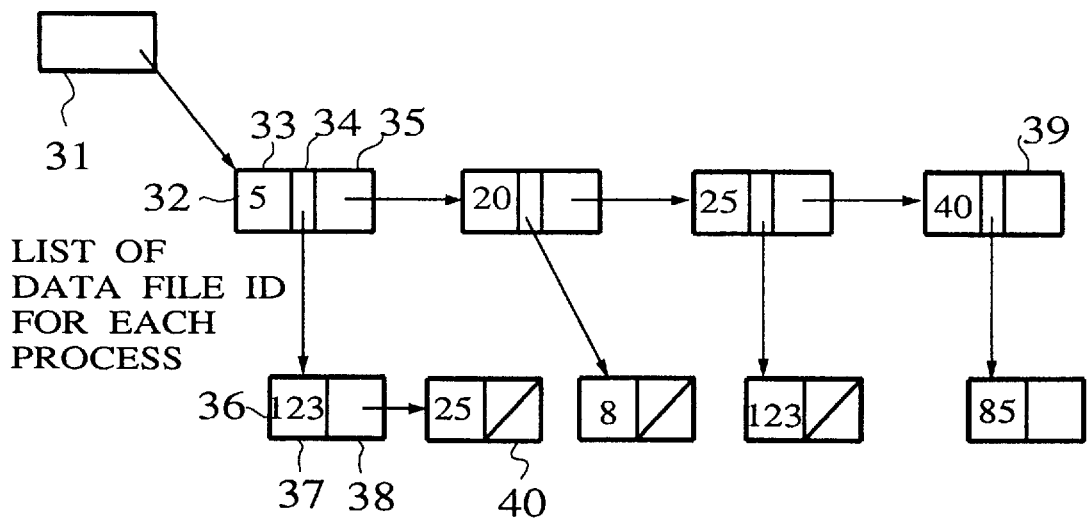
FIG. 7 is a diagrammatic illustration of a list of processes used in the protected data input recording unit of the apparatus for the second variation on the first embodiment of a data input/output management scheme according to the present invention.

Referring now to FIG. 7 and FIG. 8, the second variation of the above described first embodiment of a data input/output management scheme according to the present invention will be described in detail.

In the above described first embodiment, the permitted output targets are specified commonly for all the protected data. However, there are cases in which it is desired to permit an output of a certain protected data to a certain output target, while not permitting an output of other protected data to that certain output target. For this reason, in this second variation, the permitted output target is specified for each protected data separately in the permitted output target specifying unit 7, while an ID of each protected data given to each program is recorded in the protected data input recording unit 4, such that the output permission judgement unit 5 can judge whether the requested data output is permitted or not accordingly.

In this second variation, the configuration of the data input/output management apparatus is substantially the same as that of FIG. 5 described above.

Here, however, the protected data input recording unit 4 has an exemplary data structure in a form of a list as shown in FIG. 7, where an ID of the input/output requesting program 11 is recorded in this list of the protected data input recording unit 4 whenever the entered data is judged as the protected data. At this point, when the ID of the input/output requesting program 11 has already been recorded in this list, a data file ID of the entered data is recorded in an list entry for the protected data read by this input/output requesting program 11. On the other hand, when the ID of the input/output requesting program 11 has not yet been recorded in this list, it is newly recorded in this list, and the data file ID of the entered data is recorded as the protected data read by this input/output requesting program 11.

For example, in FIG. 7, a process ID "5" is recorded in a field 33 of a list entry 32 pointed by a pointer 31, while a pointer to a link target in a list of data file IDs is recorded in a field 34 and a pointer to a next link target in a list of process IDs is recorded in a field 35 of this list entry 32. Then, in a list entry 36 in the list of data file IDs pointed by the pointer in the field 34, a data file ID "123" is recorded in a field 37, while a pointer to a next link target is recorded in a field 38. In this manner, this list of process IDs records processes with process IDs "5", "20", "25", and "40" as the programs which read the protected data, while the list of data file ID records two data files with data file IDs "123" and "25" as the protected data read by the process with the process ID "5", one data file with a data file ID "8" as the protected data read by the process with the process ID "20", one data file with a data file ID "123" as the protected data read by the process with the process ID "25", and one data file with a data file ID "85" as the protected data read by the process with the process ID "40". When there is no next link target, a data indicating this fact is recorded in each list as in list entries 39 and 40 in FIG. 7.

In addition, the permitted output target specifying unit 7 has an exemplary data structure as shown in FIG. 8, in a form of a table of correspondence between output targets and data file IDs from which an output of the protected data to each output target is to be permitted. In this table of FIG. 8, the first line indicates that all data files are permitted to output data to "/dev/console", while the second line indicates that only the data files with the data file IDs "123" and "65" are permitted to output data to "/dev/tty∅". Similarly, the third line indicates that those data files with the data file IDs between "0" and "127" are permitted to output data to "/dev/fb", while the fourth line indicates that those data files with the data file IDs other than those between "0" to "127" are permitted to output data to "/dev/win1".

In this second variation, the output permission judgement unit 5 searches through the protected data input recording unit 4 according to the ID of the input/output requesting program 11, to obtain the data file ID of the protected data read by that program 11. In a case there is only one data file recorded, the output permission judgement unit 5 next searches through the permitted output target specifying unit 7 according to the recorded data file ID, to check whether that data file is permitted to output to the requested output target. For example, when there is a request for data output to "/dev/fb" from a process "20", the output permission judgement unit 5 operates as follows. First, by searching through the protected data input recording unit 4, it is recognized that the process "20" has read the protected data file "8". Then, by searching through the permitted output target specifying unit 7, it can be recognized that the data file "8" is permitted to output to "/dev/fb". Thus, it can be judged that the requested data output to "/dev/fb" from the process "20" is permitted.

In a case more than one data files are found to be recorded in the protected data input recording unit 4 by the search according to the ID of the input/output requesting program 11, the permitted output target specifying unit 7 is searched through next, and only when a data output to the requested output target is permitted to all of these more than one recorded data files, the requested data output can be judged as permitted. For example, when there is a request for data output to "/dev/tty∅" from a process "5", the output permission judgement unit 5 operates as follows. First, by searching through the protected data input recording unit 4, it is recognized that the process "5" has read the protected data files "123" and "25". Then, by searching through the permitted output target specifying unit 7, it can be recognized that the data file "123" is permitted to output to "/dev/tty∅", but the data file "25" is not permitted to output to "/dev/ttyø". This implies that there is a possibility for the protected data contained in the data file "25" to be outputted to the prohibited output target. Thus, it can be judged that the requested data output to "/dev/ttyø" from the process "5" is not permitted, and therefore the output permission judgement unit 5 refuses the requested data output.

Thus, according to this second variation, it also becomes possible to specify the permitted output target of the protected data for each protected data separately, so as to prohibit a data output of each protected data to the output target other than those permitted for each protected data.

Figure 9:
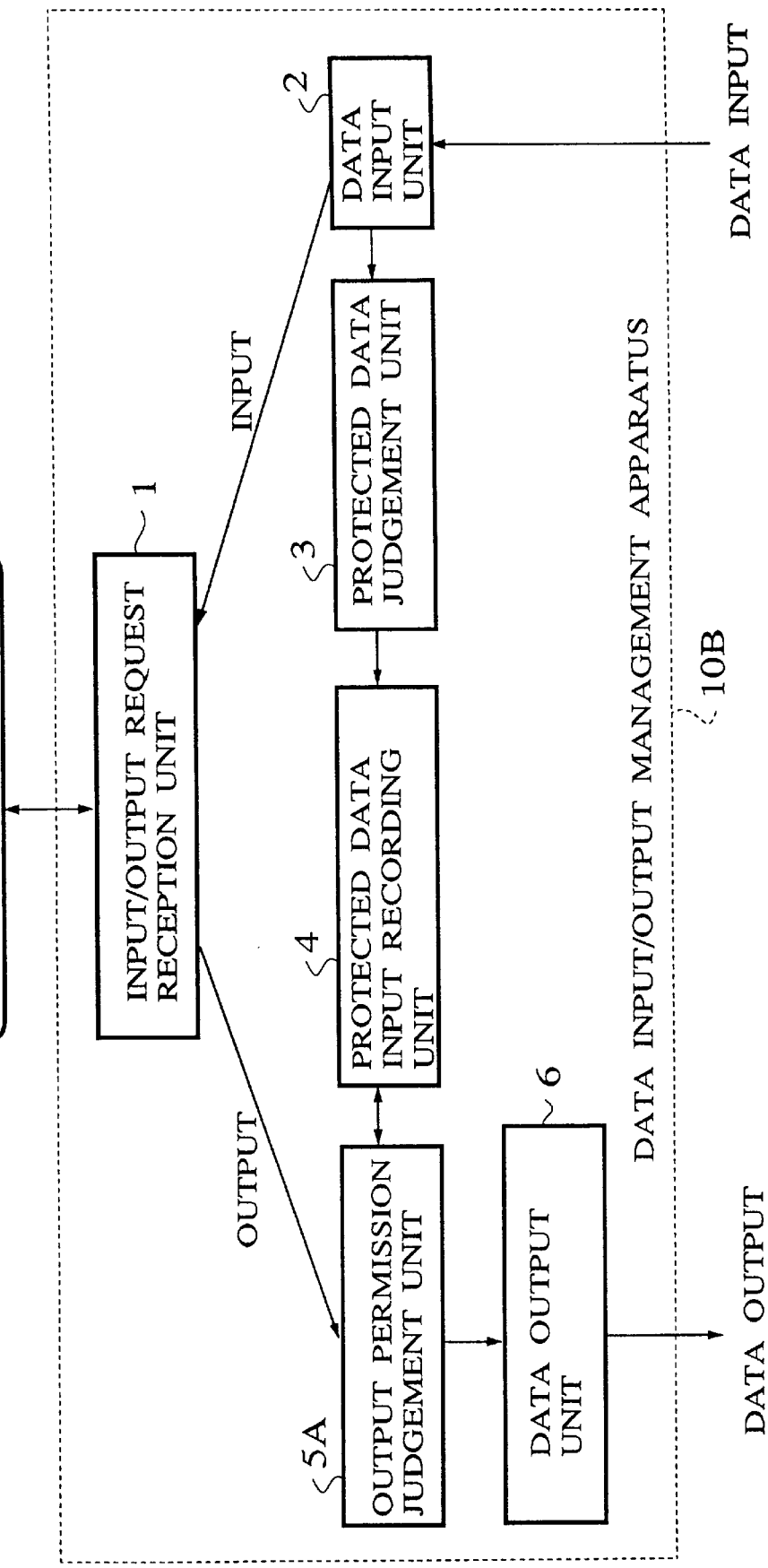
FIG. 9 is a block diagram of an apparatus for the third variation on the first embodiment of a data input/output management scheme according to the present invention.
Figure 10:
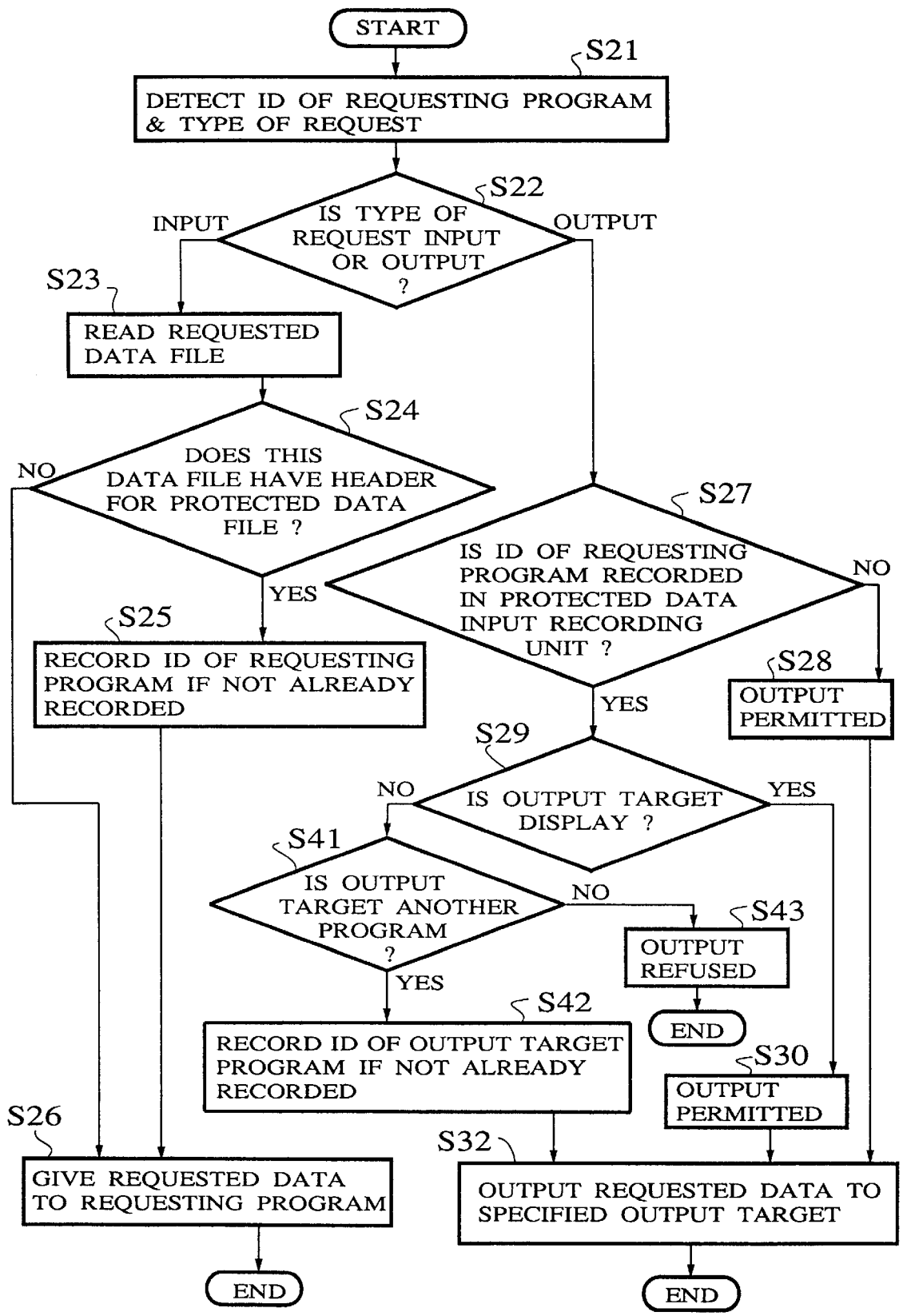
FIG. 10 is a flow chart of the operation in the apparatus of FIG. 9.

Referring now to FIG. 9 and FIG. 10, the third variation of the above described first embodiment of a data input/output management scheme according to the present invention will be described in detail.

In the above described first embodiment, it is assumed that the protected data are introduced only by the data input request from the program. In contrast, this third variation concerns with a case in which the OS has a function for supporting data exchange by communications among programs. When a program is executed under the OS having a function for supporting data exchange among programs, it is possible for a program which has read the protected data to give the protected data to another program. Consequently, in this case, it is also necessary to manage the communications among programs.

More specifically, the data input/output management apparatus 10B of this third variation has a configuration as shown in FIG. 9, which differs from that of FIG. 1 described above in that the output permission judgement unit 5A not only refers to the protected data input recording unit 4 but also modifies the recorded content in the protected data input recording unit 4.

Now, this data input/output management apparatus 10B of FIG. 9 operates according to the flow chart of FIG. 10. Here, those steps which are substantially identical to the corresponding steps in the flow chart of FIG. 2 described above are given the same reference numerals in the figure, and their description will not be repeated. In this flow chart of FIG. 10, the operation of the step S31 in FIG. 2 is replaced by the following steps S41 to S43.

Namely, when the program which has read the protected data issued the data output request (step S27 YES) and the requested output target is not an output device such as a display device from which the data cannot be directly read by another program (step S29 NO), the output permission judgement unit 5A checks whether the requested output target is another program or not (step S41). If so, there is a possibility for the protected data to be given to that another program of the requested output target as well, so that the output permission judgement unit 5A records an ID of that another program of the requested output target in the protected data input recording unit 4 unless this ID is already recorded in the protected data input recording unit 4 (step S42). The operation then proceeds to the step S32 to output the requested data to the specified output target at the data output unit 6 by means of the data exchange among the programs. On the other hand, if the requested output target is neither a device device nor another program (S29 NO and S41 NO), there is a possibility for the protected data to be duplicated, so that the requested data output is refused (S43).

Thus, according to this third variation, the program which has not read any protected data can freely transfer data as usual, whereas for the program which has read the protected data, the requested data output to an output device such as a display device from which the data cannot be directly read by another program is permitted and the data exchange with another program is permitted, but a data output to any other output target is refused. Here, a program which received the protected data by the data exchange is also handled as a program which has read the protected data subsequently, so as to prevent a duplication of the protected data.

Figure 11:
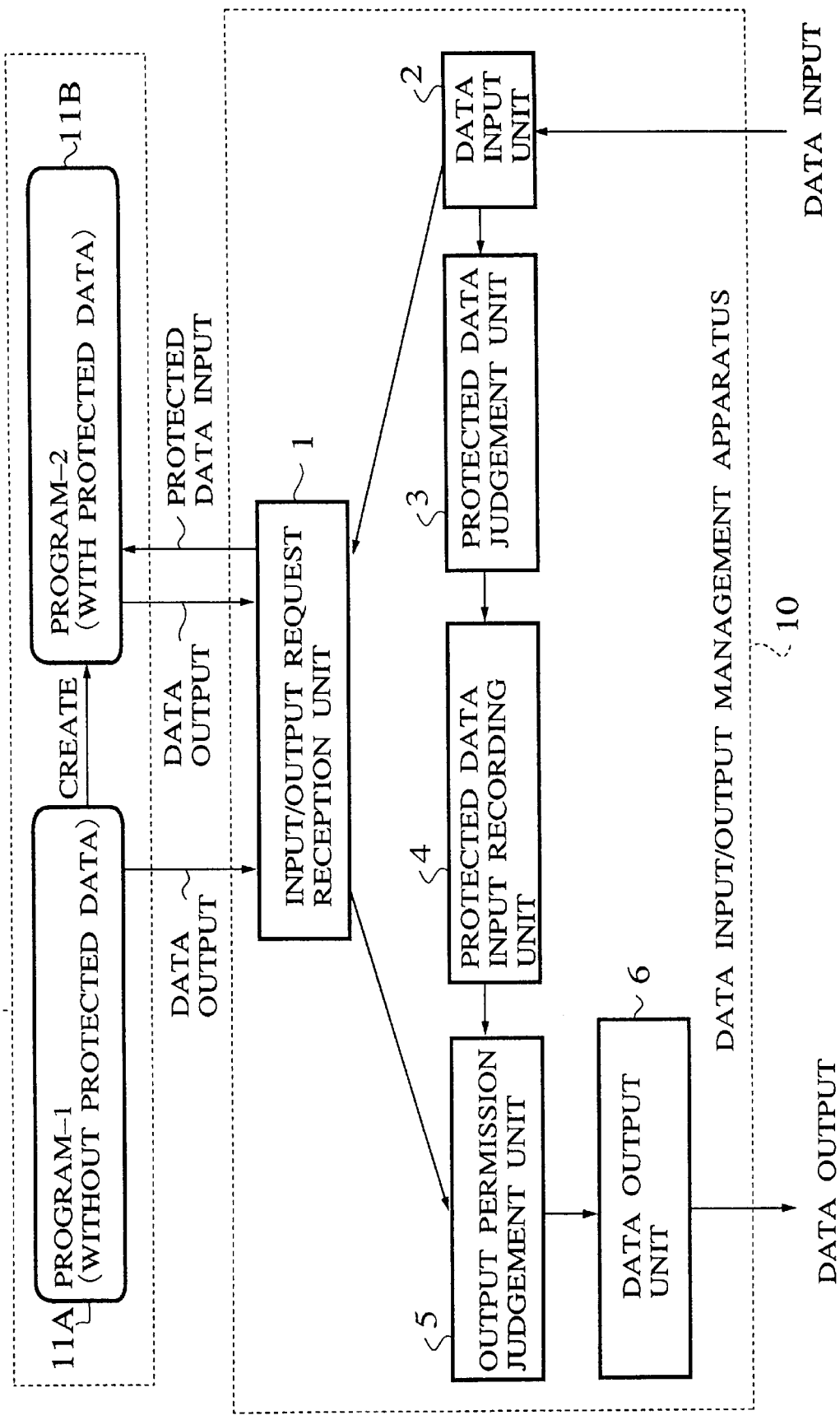
FIG. 11 is a block diagram of an apparatus for the fourth variation on the first embodiment of a data input/output management scheme according to the present invention.

Referring now to FIG. 11, the fourth variation of the above described first embodiment of a data input/output management scheme according to the present invention will be described in detail.

In the above described first embodiment, a data output request from a program which has not read the protected data is permitted unconditionally, while a data output request from a program which has read the protected data is permitted only when there is no possibility for a duplication of the protected data. Consequently, a data output request to an output target such as a file or an external port from a program which has read the protected data will be refused even for non-protected data.

In contrast, this fourth variation realizes different output controls when a data output request is issued from a program, depending on whether the requested output data is that which relates to the protected data or not. This feature has a considerable practical effect in that, when the application program reads the protected data and display that protected data to a user, it becomes possible for this user to create and store a memo related to the displayed protected data, for example. Thus, in this fourth variation, a program is made to be capable of reading the protected data as well as outputting non-protected data unrelated to the protected data to an output target such as a file or an external port.

In this fourth embodiment, as shown in FIG. 11, the data input/output management apparatus 10 similar to that of FIG. 1 is provided to control data input and data output to and from an input/output requesting program 11, just as in the first embodiment described above. Here, however, the input/output requesting program 11 can be divided into a program-1 11A without protected data and a program-2 11B with protected data.

According to this fourth variation, when the program-1 11A which has not read any protected data is going to request a data input of the protected data, this program-1 11A creates the program-2 11B first. For example, in UNIX, the program-2 11B can be considered as a duplication of a process executing the program-1 11A which is created by means of a system call "fork". In a case of the other OS, this operation can be realized by requesting a creation of a new process or task to the OS.

Then, the program-2 11B issues a data input request for the protected data. This request is then received by the input/output request reception unit 1, and an input of the protected data into the program-2 11B is recorded in the protected data input recording unit 4 just as in the first embodiment described above, such that this program-2 11B can read the protected data.

Thereafter, when a data output request is issued from the program-2 11B, this request is handled similarly as in the first embodiment described above, so that this program-2 11B cannot output any data to an output target such as a file or an external port.

On the other hand, when a data output request is issued from the program-1 11A, as this program-1 11A does not contain any protected data, the requested data output is permitted regardless of the requested output target. Consequently, by providing the non-protected data to be outputted to an output target such as a file or an external port in the program-1 11A side, it is possible to output such non-protected data freely.

More specifically, this fourth variation can be realized as follows. First, an execution of the program-1 11A starts in a state in which no protected data has been read. In a case of requesting a data input of the protected data, a new program-2 11B is created, and this program-2 11B is made to issue a data input request. An input from a user and an input of data other than the protected data are handled by the program-1 11A without protected data. In this manner, it becomes possible to manage the protected data and the non-protected data separately in different programs. Consequently, it is possible in this fourth variation to freely output the non-protected data to an output target such as a file or an external port.

Here, in a case of reading the protected data more than once, any of the following three schemes can be adopted:

(1) a scheme in which the program-2 which was used in reading the protected data before is used to read new protected data again;

(2) a scheme in which a third program different from both the program-1 and program-2 is used to read new protected data;

(3) a scheme in which the program-2 which was used in reading the protected data before is used to read new protected data again when new protected data has equivalent header content as the previously read protected data, and a third program different from both the program-1 and program-2 is used to read new protected data otherwise.

In any of these three scheme, it suffices to separate a program having the protected data from a program having data which are unprotected and possibly required to be outputted to an output target such as a file or an external port.

Figure 12:
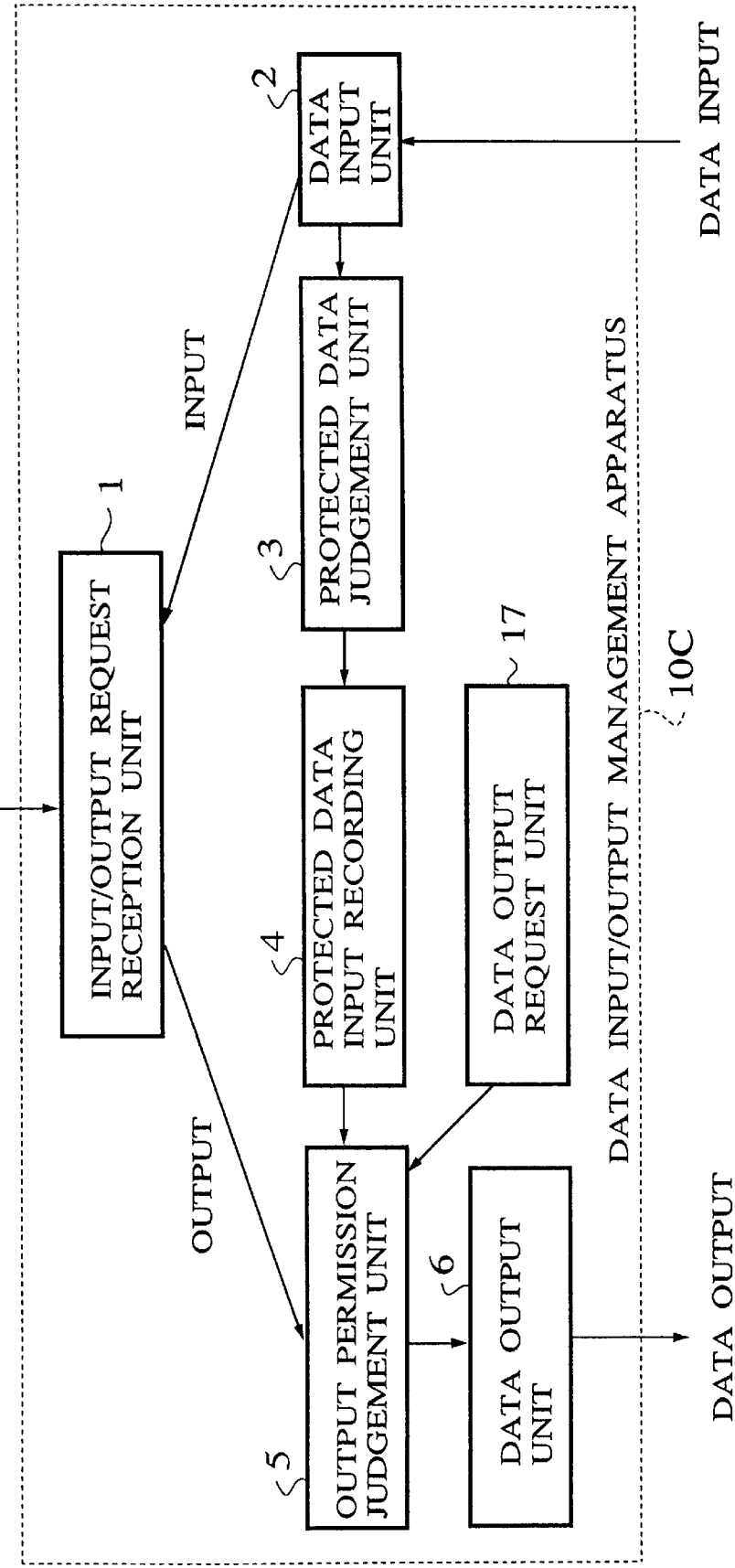
FIG. 12 is a block diagram of an apparatus for the fifth variation on the first embodiment of a data input/output management scheme according to the present invention.

Referring now to FIG. 12, the fifth variation of the above described first embodiment of a data input/output management scheme according to the present invention will be described in detail.

In the above described first embodiment, a case of making a data output permission judgement at a time of a data output request from a program has been described. However, there are cases in which the data input/output management apparatus is required to have a function for outputting data owned by a program without receiving any data output request from this program. This fifth variation concerns with such cases.

For example, there is a computer system in which text and data of a program whose execution is currently suspended are saved in a secondary memory such as a disk, and loaded into a primary memory from the secondary memory whenever necessary, in order to execute programs which are exceeding a capacity of an actually existing physical memory. This corresponds to a scheme known as a paging or a swapping in which data of a program are saved in the secondary memory without receiving any data output request from the program itself. When such a function is provided, there arises a problem that the protected data that have been developed on a memory can be copied by detaching the secondary memory medium after the protected data are saved in the secondary memory and then sequentially reading the protected data out from the detached secondary memory medium to another computer. Here, this type of a duplication of the protected data can be prevented by avoiding the saving into the secondary memory of a region of a memory on which the protected data are loaded As another example in which the data input/output management apparatus is required to have a function for outputting data owned by a program without receiving any data output request from this program, there is a case of a computer system which provides a function for copying data of a program to a file whenever an abnormal event occurs, in order to assist a development of a program. This corresponds to a function called "core dump" in UNIX for example. This "core dump" is capable of reproducing original data of a program by its operation to read out the data for the purpose of storing them into a file.

More specifically, the data input/output management apparatus 10C of this fifth variation has a configuration as shown in FIG. 12, which differs from that of FIG. 1 described above in that a data output request unit 17 connected with the output permission judgement unit 5 is provided in addition. This data output request unit 17 requests a data output by specifying an ID of a program and a range of output data for the purpose of a saving into the secondary memory or a creation of "core dump" described above.

When a data output request from this data output request unit 17 is received, the output permission judgement unit 5 operates similarly in a case of receiving a data output request via the input/output request reception unit 1.

Figure 2:
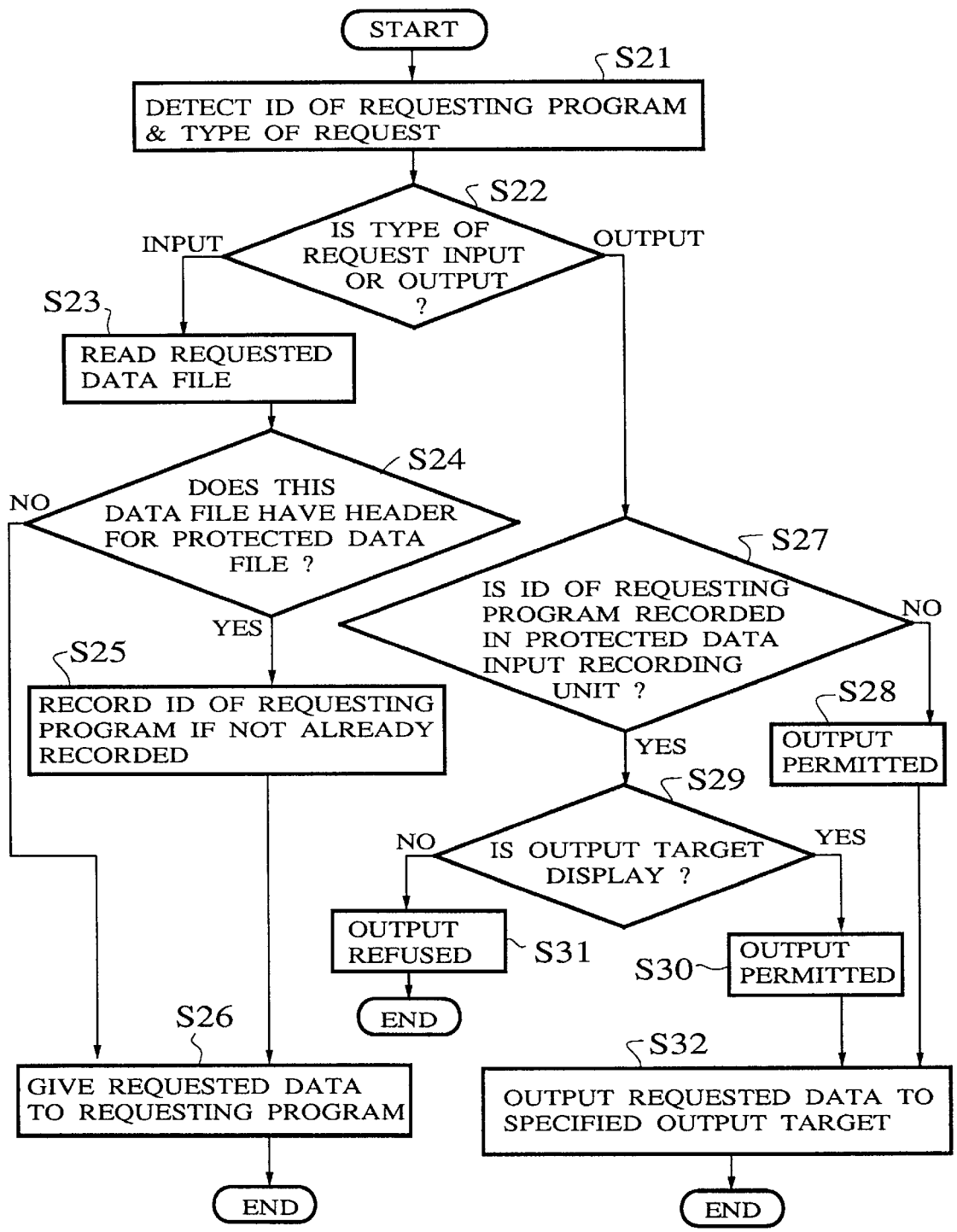
FIG. 2 is a flow chart of the operation in the apparatus of FIG. 1.

Namely, the output permission judgement unit 5 first checks whether the ID of the program specified in this data output request is recorded in the protected data input recording unit 4 or not (step S27 of FIG. 2). If not, it implies that this program has not read any protected data, so that there is no possibility for the protected data to be outputted, and consequently this data output request can be judged as permitted (step S28 of FIG. 2).

In contrast, when the ID of the program specified in this data output request is recorded in the protected data input recording unit 4, it implies that this is a program which has read the protected data, so that whether this data output request is to be permitted or not is judged according to a requested output target (step S29 of FIG. 2). Then, when the requested output target is an output device such as a display device from which the data cannot be directly read by another program, the data output request can be judged as permitted (step S30 of FIG. 2), whereas otherwise there is a possibility for the protected data to be duplicated, so that the requested data output is refused (step S31 of FIG. 2).

When the requested data output is permitted, the data output unit 6 outputs the requested data to the specified output target (step S32 of FIG. 2).

Thus, according to this fifth variation, even in a case in which the data input/output management apparatus is required to have a function for outputting data owned by a program without receiving any data output request from this program, it is possible to output any data freely from a program which has not read any protected data, while from a program which has read at least one protected data, a data output is permitted only for an output target of a transient nature such as a display device and a data output to any other output target can be prohibited. As a result, it is possible to eliminate any possibility for the protected data to be duplicated, without unnecessarily limiting a freedom for data output from any program which has not read any protected data.

It is to be noted here that, in the first embodiment and its variations described above, there is no need to limit a data output request to that which requests a sending out of data explicitly. For example, in a system call "fork" of UNIX, when a request for producing a duplication of a program is issued, a duplication is produced in an original program data portion. In this case, the data are effectively outputted to another program, so that the data output request of the first embodiment and its variations should be interpreted as including such a case as well. Similarly, a request for changing an attribute (such as name, mode, time, etc.) of a file is also a request for outputting an attribute to be newly set up with respect to the file system, so that the data output request of this first embodiment and its variations should be interpreted as including such a case as well.

It is also to be noted that, in the first embodiment and its variations described above, all types of requests from a process are handled by a single input/output request reception unit 1, but it is also possible to provide an input request reception unit for receiving data input requests alone and an output request reception unit for receiving data output requests alone separately, in which case an operation to judge a type of request as in the step S22 of FIG. 2 and FIG. 10 can be omitted.

It is also to be noted that, in the first embodiment and its variations described above, it suffices for the protected data input recording unit 4 to record at least an identifier of a subject which executes the application program with the protected data, such as a program ID in a case of a single task environment, or a task ID or a process ID in a case of multi-task environment.

It is also to be noted that the above described first embodiment and its variations according to the present invention may be conveniently implemented using a conventional general purpose digital computer programmed according to the teachings of the present specification, as will be apparent to those skilled in the computer art. Appropriate software coding can readily be prepared by skilled programmers based on the teachings of the present disclosure, as will be apparent to those skilled in the software art.

In particular, it is convenient to implement functions of the protected data judgement unit 3, the protected data input recording unit 4, and the output permission judgement unit 5 of the first embodiment described above in a form of a software package.

Such a software package can be a computer program product which employs a storage medium including stored computer code which is used to program a computer to perform the disclosed function and process of the present invention. The storage medium may include, but is not limited to, any type of conventional floppy disc, optical discs, CD-ROMs, magneto-optical discs, ROMs, RAMs, EPROMs, EEPROMs, magnetic or optical cards, or any other suitable media for storing electronic instructions.

Referring now to FIG. 13 to FIG. 17, the second embodiment of a data input/output management scheme according to the present invention will be described in detail. This second embodiment of a data input/output management scheme according to the present invention concerns with a realization of a writing data management system.

In short, in this second embodiment, a copyright kernel and an authentication result memory mechanism are provided in the OS and an authentication of an application program is carried out by using a digital signature scheme.

Figure 13:
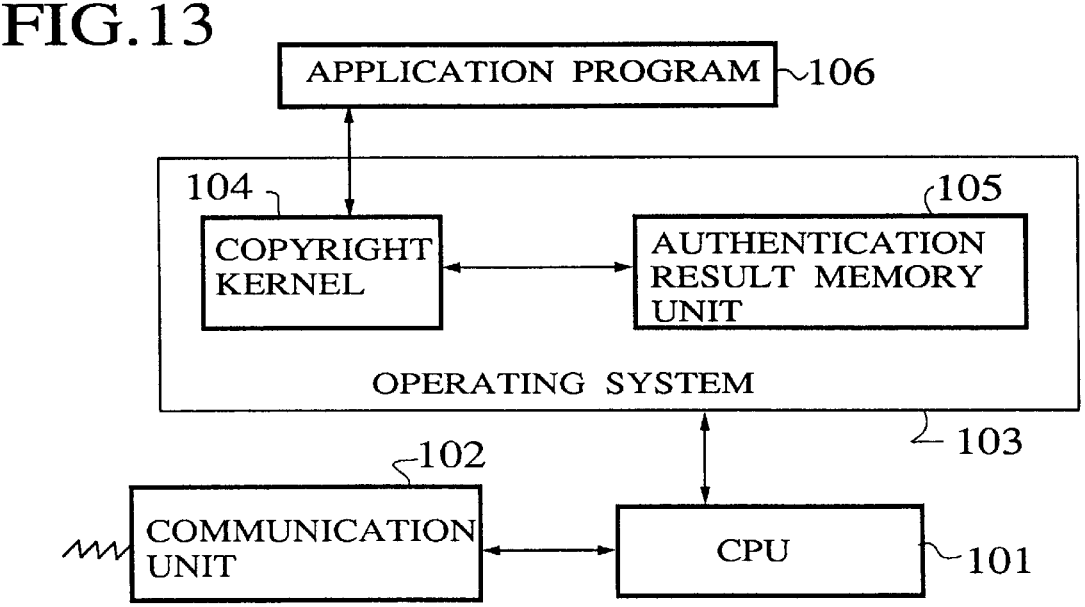
FIG. 13 is a schematic block diagram of a system for the second embodiment of a data input/output management scheme according to the present invention.

In this second embodiment, a system has a configuration as shown in FIG. 13, which comprises: a CPU 101; a communication unit 102 connected with the CPU 101; an operating system (OS) 103 executed on the CPU 101 and having a copyright kernel 104 and an authentication result memory unit 105; and an application program 106 executed under the OS 103 and handling writing data.

Here, in this second embodiment, it is assumed that a vendor of the application program 106 guarantees a proper management of the copyright labels by the application program 106. That is, it is assumed to be guaranteed that the application program 106 which handles writing data does not delete or alter the copyright labels, but does attach the copyright label for a secondary writing data by correctly reflecting a content of a copyright label for a primary writing data. This can easily be realized when a creator of the writing data is identical to a creator of an application program for handling the writing data, but it is also realizable by registering the application program to a management organization, even when a creator of the writing data is not identical to a creator of an application program. In the following, the application program which satisfies the above noted condition will be referred as a copyright observant application program.

Now, the system of FIG. 13 operates according to a flow chart of FIG. 14 and a diagram of FIG. 15 as follows.

Figure 14:
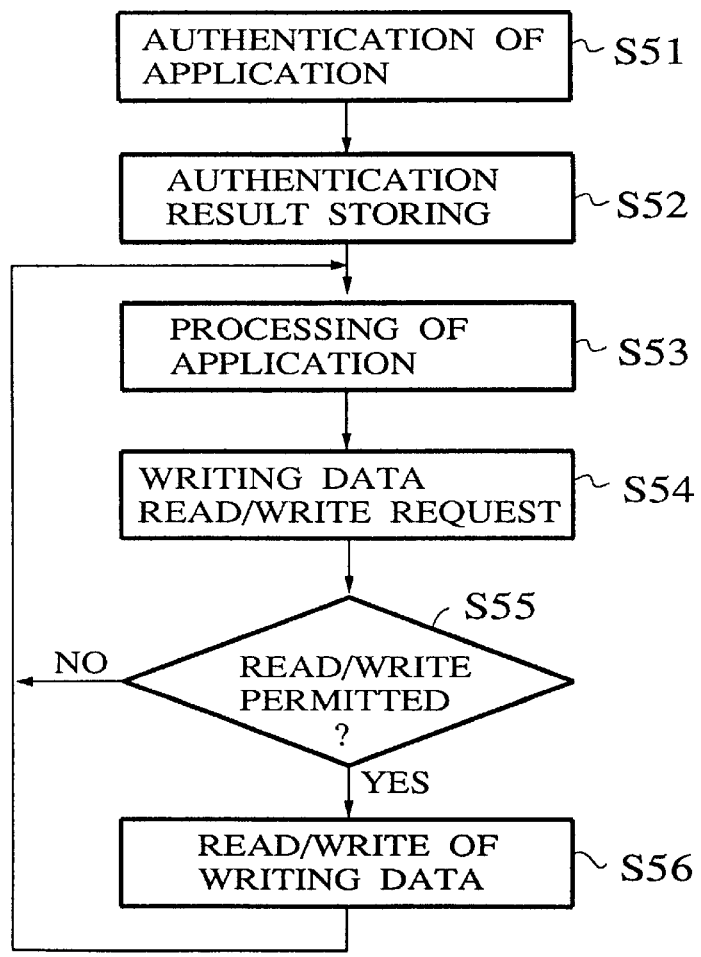
FIG. 14 is a flow chart of the operation in the system of FIG. 13.
Figure 15:
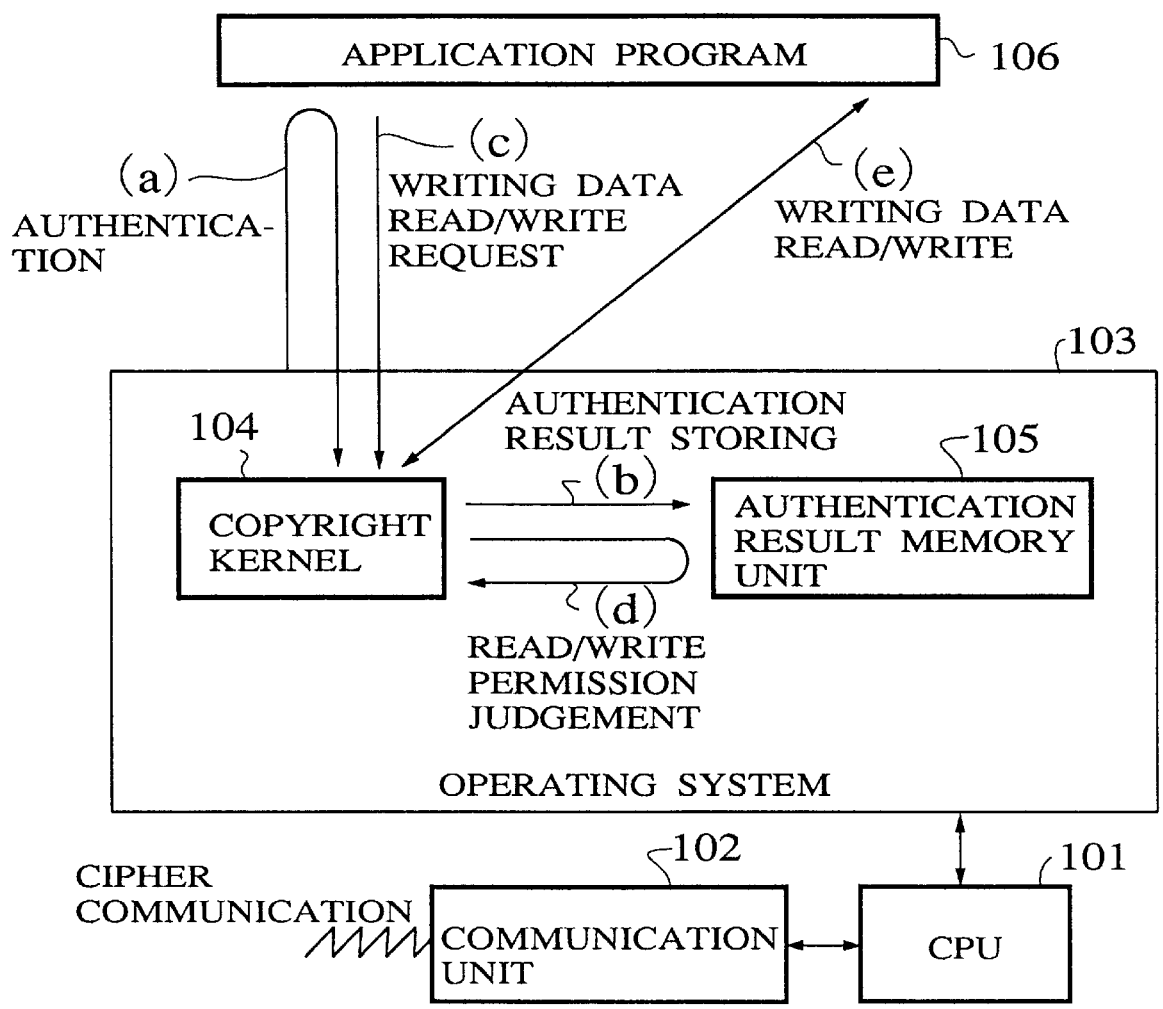
FIG. 15 is a diagram showing the operation carried out in the system of FIG. 13.

First, the copyright kernel 104 in the OS 103 executed on the CPU 101 authenticates the application program 106 by judging whether it is a registered application program or not (step S51 of FIG. 14, operation (a) of FIG. 15).

As a result of this authentication by the copyright kernel 104, when it is judged that the application program 106 is a copyright observant application program, this fact is stored in the authentication result memory unit 105 of the OS 103 (step S52 of FIG. 14, operation (b) of FIG. 15).

Thereafter, the processing of this application program 106 is carried out as usual (step S53 of FIG. 14), and when a writing data read/write request is issued from the application program 106 to the OS 103 (step S54 of FIG. 14, operation (c) of FIG. 15), the OS 103 checks the authentication result memory unit 105 to make a read/write permission judgement as to whether this application program 106 is a copyright observant application program or not (step S55 of FIG. 14, operation (d) of FIG. 15). When it is confirmed that this application program 106 is a copyright observant application program, this writing data read/write request is permitted (step S56 of FIG. 14, operation (e) of FIG. 15), whereas otherwise this writing data read/write request is rejected. In this manner, it becomes possible to manage the writing data properly.

Now, the system of FIG. 13 is connected with an external device via the communication unit 102 such as modem, LAN adaptor card, SCSI interface card, etc., such that it is possible to exchange writing data with the external device through a network (not shown). Here, the writing data on the network can be protected by utilizing means of cipher communication for example.

In this second embodiment, the management of the OS 103 is carried out by a manager of a management organization to which the management of the writing data is entrusted, so that an organization or individual who utilizes this system (which will be collectively referred hereafter as a user) is not provided with any function for a system management. For this reason, it is impossible to alter the copyright kernel 104 or the authentication result memory unit 105 improperly, and therefore it becomes possible to manage the writing data properly.

Here, as a scheme for the authentication in this system of FIG. 13, it is possible to use a digital signature scheme with respect to an execution file of an application program using a public key ciphering scheme.

Figures 16, 17:
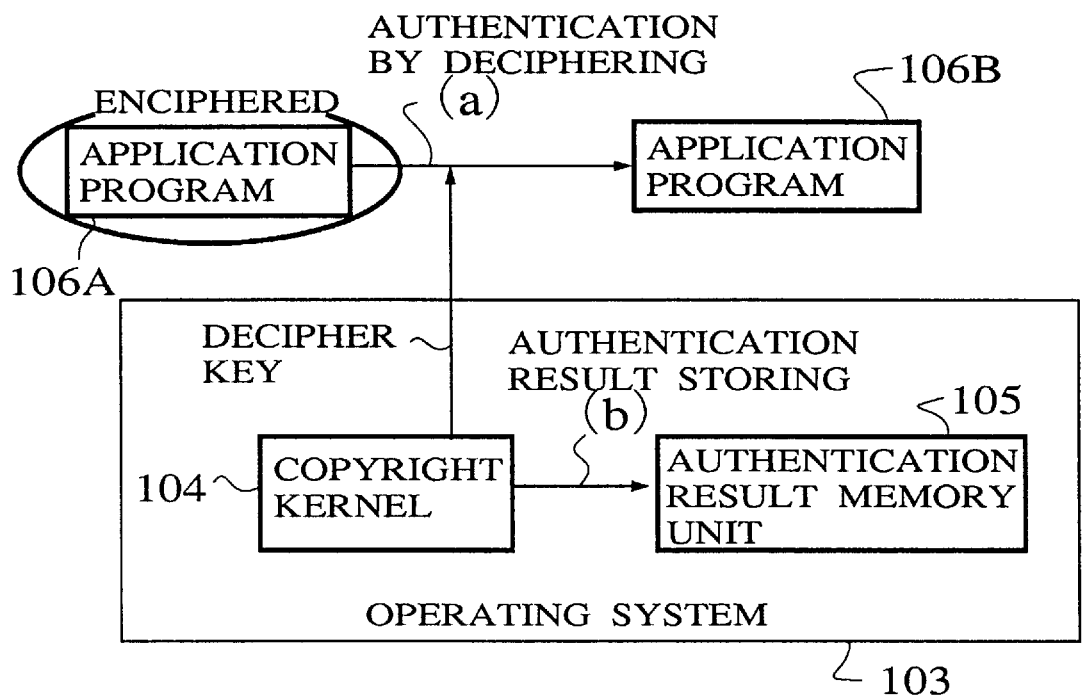
FIG. 16 is a schematic diagram showing the operation of the copyright kernel of the system of FIG. 13.
FIG. 17 is a diagrammatic illustration of a management table used in the authentication result memory unit of the system of FIG. 13.

In this case, the authentication operation can be carried out according to a diagram of FIG. 16 showing a section related to an authentication in this system schematically.

Namely, a vendor of the application program 106 confirms that the application program 106 is a copyright observant application program, and then enciphers the application program 106 by using a secret (non-public) cipher key. The resulting enciphered file for the application program 106 is then distributed to the users. A decipher key for deciphering the application program 106 is made public, or else given to only those users who are permitted to use the application program 106 in advance.

As described, the OS 103 of this system has a section called copyright kernel 104 which is responsible for the processing related to the copyright. In further detail, this copyright kernel 104 operates as follows. First, at a time of execution of the application program 106, the copyright kernel 104 deciphers the enciphered file of the application program 106 by using a public decipher key (operation (a) of FIG. 16) to obtain a deciphered application program 106B from an enciphered application program 106A. Then, when the deciphering is successfully completed, it implies that the application program 106 is correctly authenticated, so that the obtained execution file in plain text (deciphered application program 106B) is executed, while the success of the authentication is stored in the authentication result memory unit 105 (operation (b) of FIG. 16).

Here, the authentication result memory unit 105 has a management table as shown in FIG. 17, which registers the authentication result (a success indicated by a symbol ○, a failure indicated by a symbol ×) for each application program, indicating whether each application program is a copyright observant application program or not.

Thus, in this second embodiment, it is possible to distinguish the copyright observant application program from another application program independently created by the user. Also, even when the user attempts to analyze the copyright observant application program by the reverse engineering and modify the copyright observant application program to operate the copyright label improperly, the copyright observant application program is to be enciphered by the secret cipher key so that it is impossible for a general user to encipher the copyright observant application program correctly, and therefore the attempted improper operation will be uncovered by the failure to achieve a correct deciphering at a time of deciphering the modified copyright observant application program.

As described, according to this second embodiment, the copyright observant application program can be distinguished by means of the authentication using the digital signature scheme, and it is possible to prevent an infringement of the copyright by means of an improper operation of the copyright label by the application program. Consequently, it is possible to process the passive writing data such as pictures, novels, etc. on a computer system, without incurring any possibility for the copyright infringement.

Moreover, it is impossible for a user to analyze and alter the application program, so that it is possible to realize a high security level.

Here, regarding a possibility for an infringement of the copyright, the authenticated application programs are guaranteed to be the copyright observant application programs by creators of these application programs, so that there is no possibility for the copyright to be infringed by these authenticated application programs. In addition, a read/write of the writing data by the unauthenticated application programs is prohibited, so that there is no possibility for the copyright to be infringed by these unauthenticated application programs either.

In addition, only the copyright observant application programs are allowed to read the writing data or produce a secondary writing data from a primary writing data, so that the application program which received the writing data can process the received writing data freely. Thus, it is possible to change the already existing application program into the copyright observant application program by a slight modification, unlike a system in which the data are not directly given to the application program.

Moreover, there is no need to call up the OS every time the processing of the writing data is to be carried out so that it is also possible to improve the processing speed.

Furthermore, it becomes possible to realize a sophisticated management of the secondary use, i.e., the secondary writing data obtained from the primary writing data. In general, it is difficult for the OS which is not comprehending details of the processing at the application program to manage which part of the primary writing data is utilized in which secondary writing data, and such a secondary utilization relationship is more accurately comprehended by the application program. In this regard, according to this second embodiment, the application program can generate the copyright label for the secondary writing data, so that it is possible to reflect the copyright of the primary writing data quite accurately in the secondary writing data.

Figure 18:
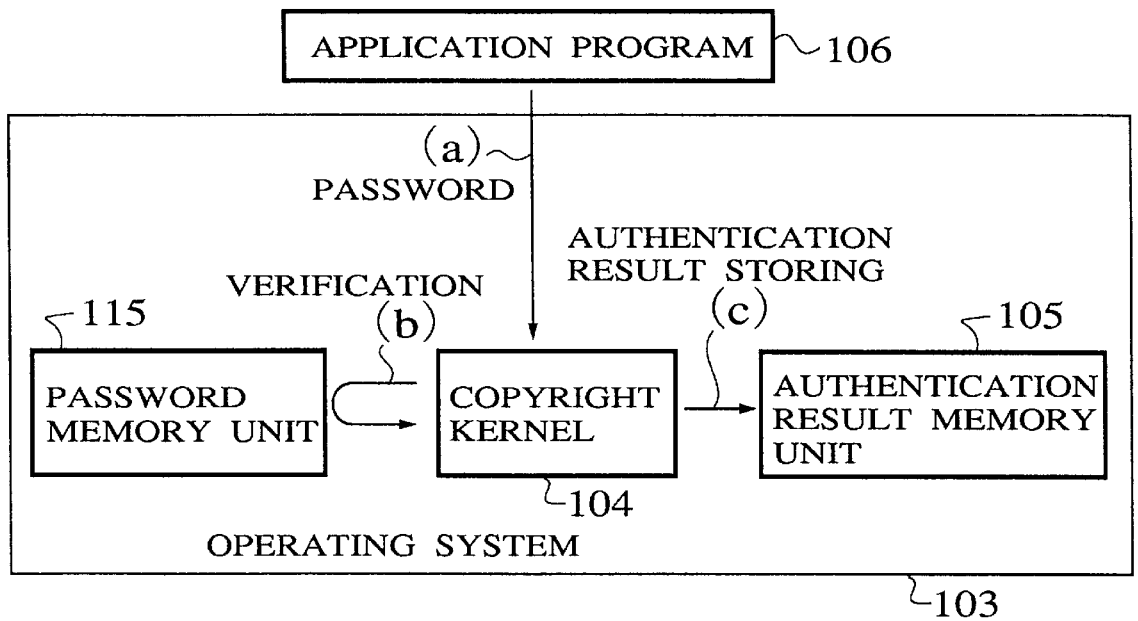
FIG. 18 is a schematic block diagram showing the operation in a system for the first variation on the second embodiment of a data input/output management scheme according to the present invention.

Referring now to FIG. 18, the first variation of the above described second embodiment of a data input/output management scheme according to the present invention will be described in detail.

This first variation differs from the above described second embodiment in that a password is used instead of the digital signature.

In this first variation, a section related to an authentication has a configuration as shown in FIG. 18, where other section is identical to that of FIG. 13 and therefore omitted, and those elements which are substantially equivalent to the corresponding elements in FIG. 13 are given the same reference numerals. In this configuration of FIG. 18, the OS 103 has a password memory unit 115 for storing an ID of each copyright observant application program and a password common to all the copyright observant application programs, in addition to the copyright kernel 104 and the authentication result memory unit 105.

More specifically, in this first variation, the application program 106 has a uniquely assigned ID and a password, and at a time of execution of this application program 106, this application program 106 presents its own password to the OS 103 (operation (a) in FIG. 18). In response, the copyright kernel 104 verifies the ID and the password of the application program 106 against the IDs and password stored in a password memory unit 115 (operation (b) in FIG. 18), and only when the password presented from the application program 106 is verified as a proper one (i.e., the presented password matches with the stored password), the success of the authentication is stored in the authentication result memory unit 105 (operation (c) if FIG. 18).

This first variation requires no ciphering of the application program, so that compared with the above described second embodiment, there are advantages that the activation of the application program can be faster and the system configuration can be simpler.

Figure 19:
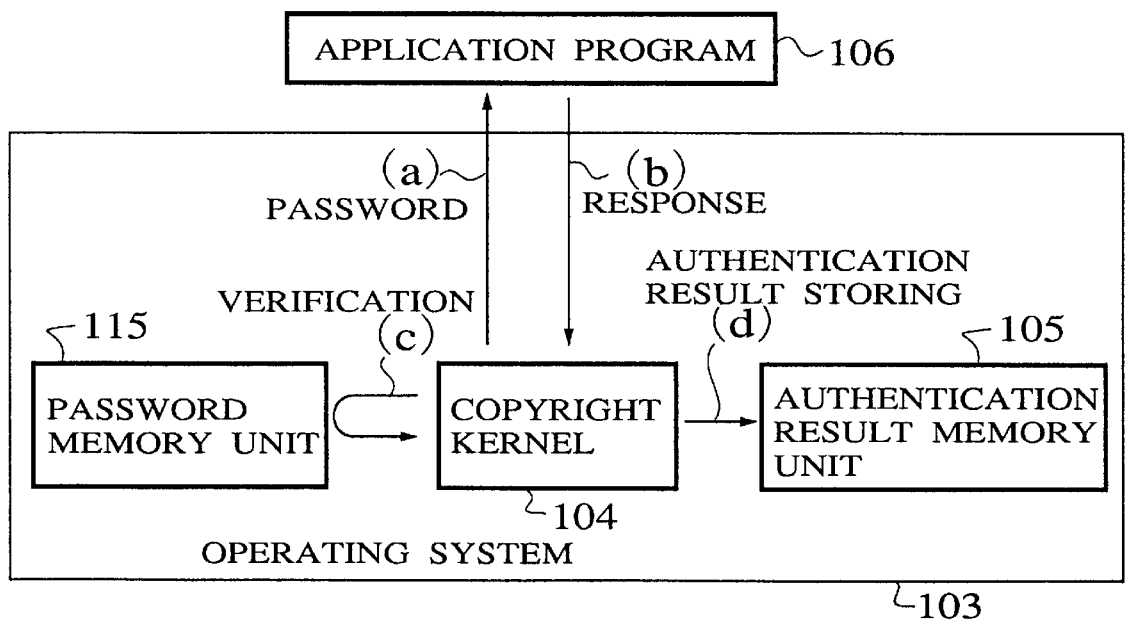
FIG. 19 is a schematic block diagram showing the operation in a system for the second variation on the second embodiment of a data input/output management scheme according to the present invention.

Referring now to FIG. 19, the second variation of the above described second embodiment of a data input/output management scheme according to the present invention will be described in detail.

This second variation differs from the above described first variation in that a plurality of passwords are used instead of a single fixed password.

In this second variation, a section related to an authentication has a configuration as shown in FIG. 19, where another section is identical to that of FIG. 13 and therefore omitted, and those elements which are substantially equivalent to the corresponding elements in FIG. 13 are given the same reference numerals. In this configuration of FIG. 19, the OS 103 has a password memory unit 115 for storing a plurality of passwords common to the copyright observant application programs along with predetermined responses corresponding to these plurality of passwords, in addition to the copyright kernel 104 and the authentication result memory unit 105.

Namely, when a single fixed password is used as in the first variation described above, it becomes impossible to carry out the proper authentication in a case that single fixed password is leaked. For this reason, in this second variation, a set of passwords are determined in advance for the copyright observant application programs, and the OS 103 first notifies one password (which can be a word, a numerical value, etc.) selected from the predetermined set of passwords to the application program 106 (operation (a) in FIG. 19). In response, the application program 106 returns a predetermined response corresponding to that one password notified from the OS 103 (operation (b) in FIG. 19). Then, the copyright kernel 104 verifies the returned response against a proper response stored in the password memory unit 15 (operation (c) of FIG. 19), and only when the response returned from the application program 106 is verified as a proper one (i.e., the returned response matches with the stored response corresponding to the notified password), the success of the authentication is stored in the authentication result memory unit 105 (operation (d) if FIG. 19).

This second variation has an advantage that a possibility for becoming impossible to carry out the proper authentication due to the leakage of the password can be reduced compared with the above described first variation.

Figure 20:
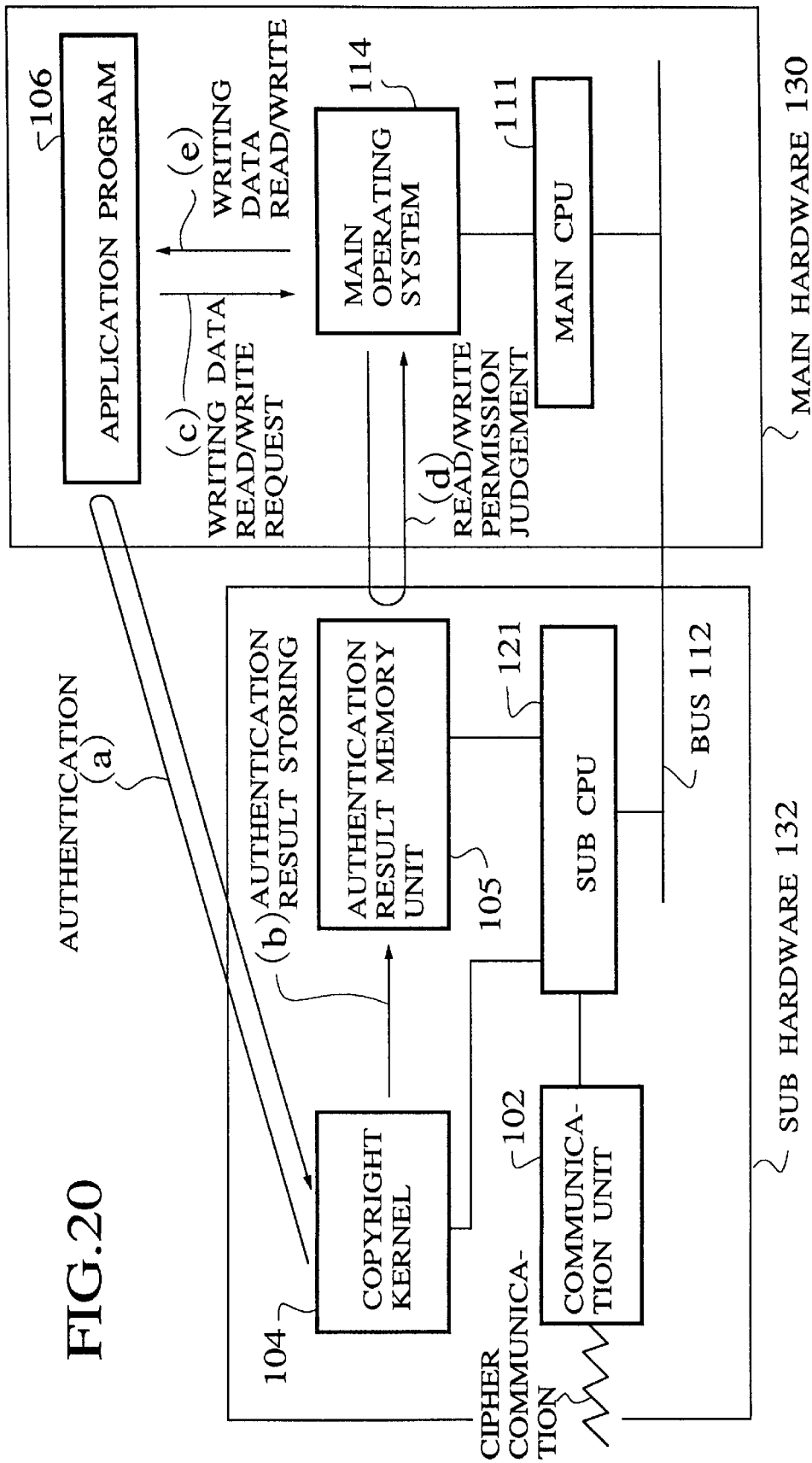
FIG. 20 is a schematic block diagram of a system for the third variation on the second embodiment of a data input/output management scheme according to the present invention.

Referring now to FIG. 20, the third variation of the above described second embodiment of a data input/output management scheme according to the present invention will be described in detail.

This third variation differs from the above described second embodiment in that a section related to the writing data management and a remaining section are separated and implemented on separate hardwares, such that a user can carry out the management of a section unrelated to the writing data management, while preventing an improper management of the copyright labels under the right of a system manager, so as to realize a very high security level. In this manner, is becomes possible to construct the system according to the present invention on a basis of a conventional OS such as UNIX.

In this third variation, the system has a configuration as shown in FIG. 20, which generally comprises: a main hardware 130 which is unrelated to the writing data management and a sub hardware 132 which is related to the writing data management. The main hardware 130 has a main CPU 111, a main operating system (OS) 114 executed on the main CPU 111, and an application program 106 executed under the main OS 114, while the sub hardware 132 has a sub CPU 121, a communication unit 102 connected with the sub CPU 121, a copyright kernel 104, and an authentication result memory unit 105, where the main CPU 111 and the sub CPU 121 are mutually connected through a bus 112.

Here, Just as in the above described second embodiment, it is assumed that a vendor of the application program 106 guarantees a proper management of the copyright labels by the application program 106. Then, such a copyright observant application program is registered in the management organization to which the writing data management is entrusted.

Now, the system of FIG. 20 operates similarly as the above described second embodiment, as follows.

First, the copyright kernel 104 provided on the sub CPU 121 authenticates the application program 106 by judging whether it is a registered application program or not (operation (a) of FIG. 20).

As a result of this authentication by the copyright kernel 104, when it is judged that the application program 106 is a copyright observant application program, this fact is stored in the authentication result memory unit 105 provided on the sub CPU 121 (operation (b) of FIG. 20).

Thereafter, when a writing data read/write request is issued from the application program 106 to the main OS 114 (operation (c) of FIG. 20), the main OS 114 checks the authentication result memory unit 105 to make a read/write permission judgement as to whether this application program 106 is a copyright observant application program or not (operation (d) of FIG. 20). When it is confirmed that this application program 106 is a copyright observant application program, this writing data read/write request is permitted (operation (e) of FIG. 20), whereas otherwise this writing data read/write request is rejected.

In this third variation, even when a malicious system manager attempts to alter the writing data by rewriting the setting in the main OS 114 on the main hardware 130 side, the copyright kernel 104 and the authentication result memory unit 105 for managing the writing data are provided on the sub hardware 132 side separated from the main hardware 130, so that the attempted alteration cannot be carried out. Consequently, even when the management of the main hardware 130 to a user, it is still possible to manage the writing data properly.

In addition, even when an intrusion into the main OS or the application program occurs, it is still hard to alter the authentication result on the separate hardware, so that it becomes possible to prevent the copyright infringement more effectively.

Figure 21:
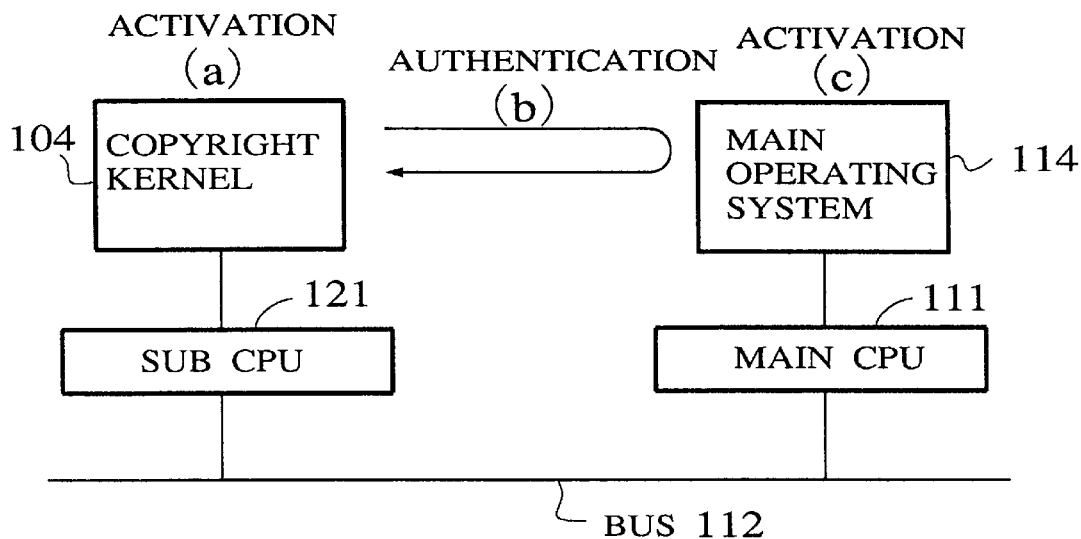
FIG. 21 is a schematic block diagram showing the operation in a system for the fourth variation on the second embodiment of a data input/output management scheme according to the present invention.

Referring now to FIG. 21, the fourth variation of the above described second embodiment of a data input/output management scheme according to the present invention will be described in detail.

This fourth variation is a further variation on the third variation described above, which incorporates the authentication of the main OS 114 at a time of an activation of the system. Namely, even when the authentication of the application program 106 is carried out properly as in the third variation, if the main OS 114 itself is altered, it is still possible to alter the operation of the system such that the writing data read/write permission judgement cannot be carried out properly, and/or the management of the writing data cannot be carried out properly. This fourth variation provides a protection measure against such an alteration of the main OS 114.

In this fourth variation, a system has a configuration as shown in FIG. 21, where a section unchanged from that of FIG. 13 is omitted, and those elements which are substantially equivalent to the corresponding elements in FIG. 20 are given the same reference numerals.

In this configuration of FIG. 21, at a time of activation of the system, the sub CPU 121 is activated first (operation (a) in FIG. 21), and then before the activation of the main OS 114 on the main CPU 111 (operation (c) in FIG. 21), the main OS 114 on the main CPU 111 is authenticated by a program on the sub CPU 121 (operation (b) in FIG. 21).

Here, the authentication of the main OS 114 on the main CPU 111 by the sub CPU 121 can be realized by a similar scheme as used in the authentication of the application program by the OS described above.

Figure 22:
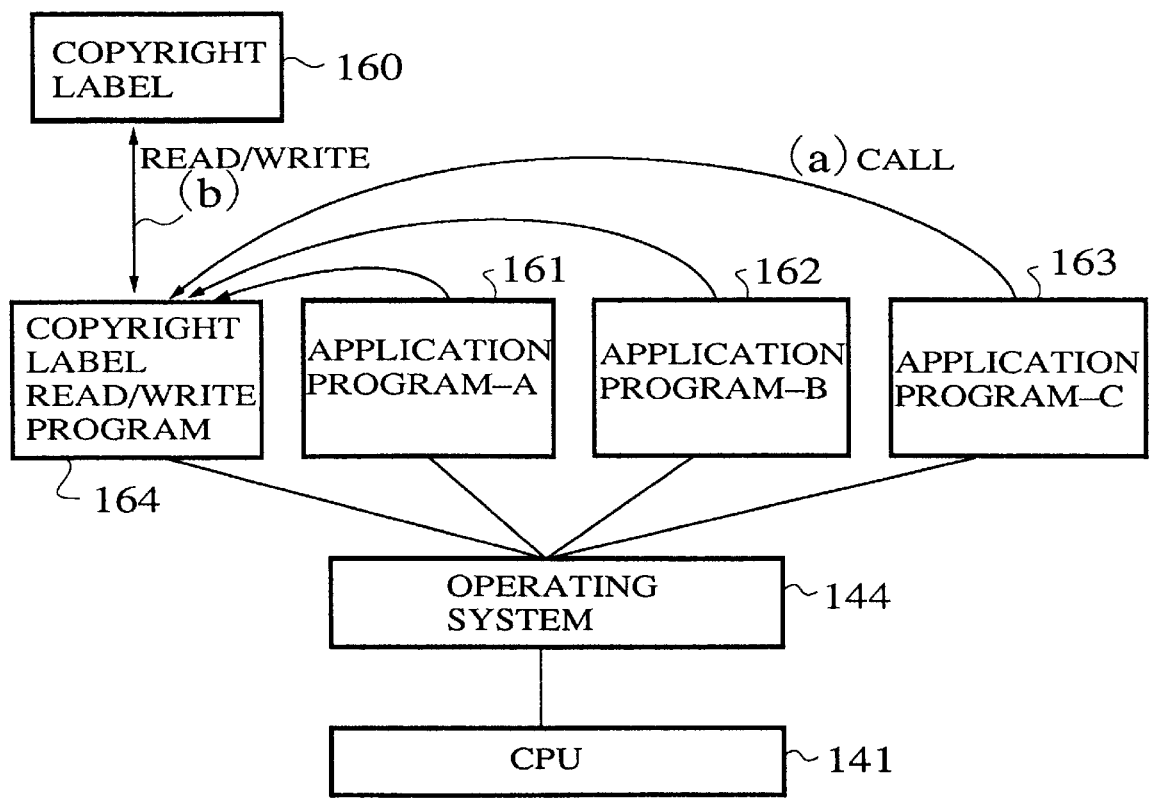
FIG. 22 is a schematic block diagram of a system for the fifth variation on the second embodiment of a data input/output management scheme according to the present invention.

Referring now to FIG. 22, the fifth variation of the above described second embodiment of a data input/output management scheme according to the present invention will be described in detail.

This fifth variation differs from the above described second embodiment in that, a read/write of the copyright label is carried out independently by each application program in the above described second embodiment, but in this fifth variation, there is provided a copyright label read/write program for collectively handling all the copyright label read/write operations, such that the read/write of the copyright label is carried out by calling up this copyright label read/write program from the copyright observant application program.

In this fifth variation, a system has a configuration as shown in FIG. 22, which comprises a plurality of application programs 161 to 163 and a copyright label read/write program 164 all of which are executed under an OS 144 on a CPU 141, where only the copyright label read/write program 164 has an access to the copyright label 160.

In this configuration of FIG. 22, each one of the application programs 161 to 163 calls up th copyright label read/write program 164 (operation (a) in FIG. 22), and then the copyright label read/write program 164 carried out the read/write operation with respect to the actual copyright label 160 (operation (b) in FIG. 22).

In this fifth variation, there is no need to provide a routine for carrying out the copyright label read/write operation in each application program separately, so that an application program development efficiency can be improved, while eliminating a possibility for an improper management of the copyright labels as long as the application program utilizes the library, i.e., the copyright label read/write program, properly.

Next, the sixth variation of the above described second embodiment of a data input/output management scheme according to the present invention will be described in detail.

This sixth variation differs from the above described second embodiment in that, a read and a write of the writing data are both prohibited for an application program which is not a copyright observant application program, but in this sixth variation, only a write of the writing data is prohibited while a read of the writing data is permitted for an application program which is not a copyright observant application program.

Even in this manner, it is impossible for the non-copyright observant application program to make a copy of the writing data, so that it is still possible to achieve the prevention of the copyright infringement at least.

Referring now to FIG. 23, the seventh variation of the above described second embodiment of a data input/output management scheme according to the present invention will be described in detail.

This seventh variation differs from the above described second embodiment in that, in the above described second embodiment the application programs are classified into two categories of the copyright observant application programs and the non-copyright observant application programs while a single management organization carries out the management of the application programs, such that all the application programs for operating the writing data must be registered in that management organization, but in contrast, in this seventh variation, the classification of the application programs is further refined such that a vendor of each writing data can freely determine which application programs are trustworthy.

In this seventh variation, there is an advantage that a management organization for carrying out a centralized management becomes unnecessary. In addition, there is also an advantage that the protection of the copyright can be carried out in more refined manner, as it becomes possible for a vendor of each writing data to individually permit read/write from the application programs created by the trustworthy vendors such as a company of this vendor itself, associated companies, contracted companies, etc.

In this case, the system configuration is substantially similar to that shown in FIG. 13 described above, but the authentication result memory unit 105 has a management table as shown in FIG. 23, which registers whether a read/write is permitted with respect to each writing data (a permission indicated by a symbol ○, a rejection indicated by a symbol ×) for each application program, i.e., whether each application program is authenticated with respect to each writing data.

Here, it suffices to use the authentication scheme similar to that used in the above described second embodiment or that used in the above described first or second variation.

According to this seventh variation, even if the application program which does not manage the copyright labels properly is registered, it is still possible to prevent the copyright infringement from occurring over a wide spread range.

Figure 24:
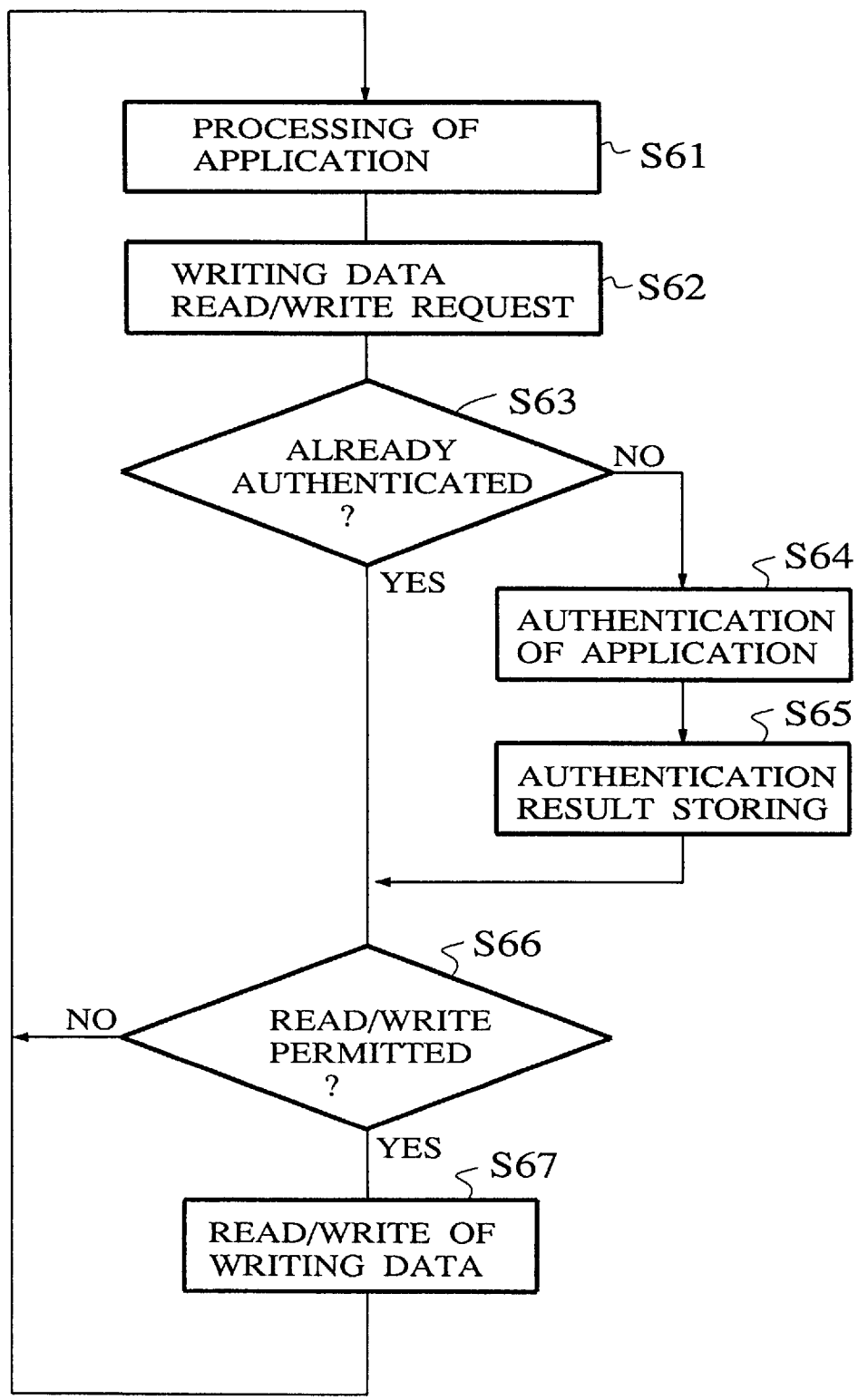
FIG. 24 is a flow chart of the operation in a system for the eighth variation on the second embodiment of a data input/output management scheme according to the present invention.

Referring now to FIG. 24, the eighth variation of the above described second embodiment of a data input/output management scheme according to the present invention will be described in detail.

This eighth variation differs from the above described second embodiment in that the authentication is carried out only when the writing data read/write request is issued from the application program, instead of carrying out the authentication at the beginning.

In this case, the system configuration is substantially as shown in FIG. 13 described above.

Here, however, the system operates according to a flow chart of FIG. 24 as follows.

First, while the processing of the application program is carried out (step S61), when a writing data read/write request is issued from the application program 106 executed on the CPU 101 to the OS 103 (step S62), this OS 103 checks whether the authentication has already been carried out for this application program 106 by referring to the authentication result memory unit 105 provided therein (step S63).

In a case the authentication has not been carried out yet so that there is no record for this application program 106 in the authentication result memory unit 105, the copyright kernel 104 provided in the OS 103 authenticates the application program 106 by judging whether it is a registered application program or not (step S64).

As a result of this authentication by the copyright kernel 104, when it is judged that the application program 106 is a copyright observant application program, this fact is stored in the authentication result memory unit 105 of the OS 103 (step S65).

In a case the authentication has already been carried out, the steps S64 and S65 are skipped.

Then, the OS 103 checks the authentication result memory unit 105 to make a read/write permission judgement as to whether this application program 106 is a copyright observant application program or not (step S66).

When it is confirmed that this application program 106 is a copyright observant application program, this writing data read/write request is permitted (step S67), whereas otherwise this writing data read/write request is rejected. In this manner, it is also possible to manage the writing data properly.

According to this eighth variation, the application program activation speed can be faster as the authentication is not carried out at a time of activation of the application program. In addition, the authentication operation is not at all carried out for an application program which does not request any read/write of the writing data, so that the application program execution speed can also be faster compared with the above described second embodiment.

Figure 25:
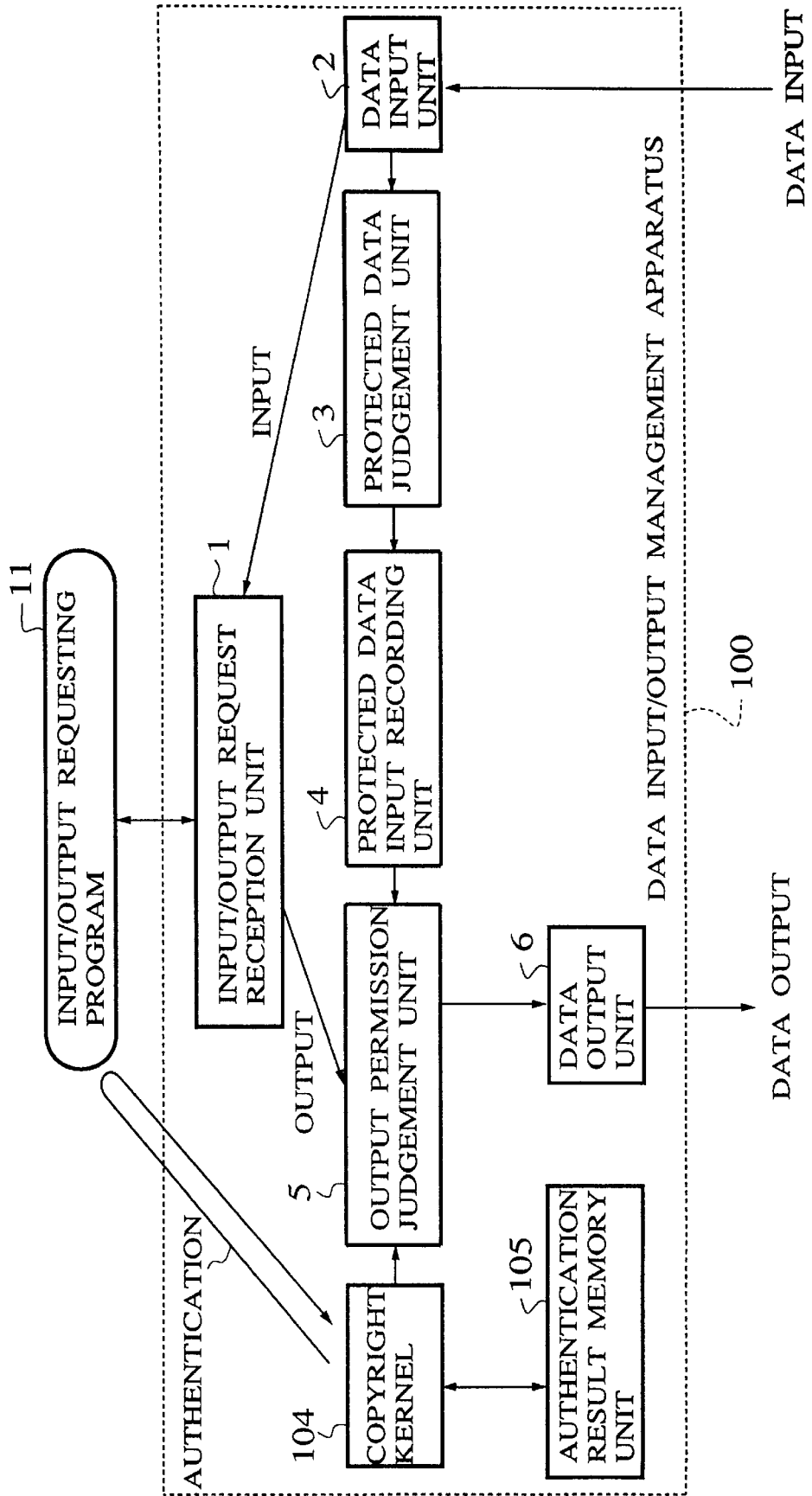
FIG. 25 is a schematic block diagram of a system for the ninth variation on the second embodiment of a data input/output management scheme according to the present invention.

Referring now to FIG. 25, the ninth variation of the above described second embodiment of a data input/output management scheme according to the present invention will be described in detail.

This ninth variation concerns with a combination of the above described first embodiment and the above described second embodiment.

In this ninth variation, the system has a configuration as shown in FIG. 25, in which a data input/output management apparatus 100 is provided to control data input and data output to and from an input/output requesting program 11, where the apparatus comprises: an input/output request reception unit 1, a data input unit 2, a protected data judgement unit 3, a protected data input recording unit 4, an output permission judgement unit 5, and a data output unit 6 which are substantially similar to those of the first embodiment shown in FIG. 1, and a copyright kernel 104 and an authentication result memory unit 105 which are substantially similar to those of the second embodiment shown in FIG. 13. This data input/output management apparatus 100 as a whole can be realized in a form of the OS operating on a processor.

In this configuration of FIG. 25, a read/write of the writing data is permitted for a copyright observant application program just as in the second embodiment described above. In addition, a read/write of the writing data is controlled for a non-copyright observant application program by means of the management scheme according to the first embodiment described above, treating the writing data as a kind of the protected data, such that the read/write of the writing data in permitted for a non-copyright observant application program provided whenever there is no possibility for the writing data to be duplicated.

Even in this manner, it is impossible for the non-copyright observant application program to make a copy of the writing data, so that it is still possible to achieve the prevention of the copyright infringement at least, without prohibiting all the read/write operations by a non-copyright observant application program.

It is also to be noted that the above described second embodiment and its variations according to the present invention may be conveniently implemented using a conventional general purpose digital computer programmed according to the teachings of the present specification, as will be apparent to those skilled in the computer art. Appropriate software coding can readily be prepared by skilled programmers based on the teachings of the present disclosure, as will be apparent to those skilled in the software art.

In particular, it is convenient to implement functions of the copyright kernel 104 and the authentication result memory unit 105 of the second embodiment described above in a form of a software package.

Such a software package can be a computer program product which employs a storage medium including stored computer code which is used to program a computer to perform the disclosed function and process of the present invention. The storage medium may include, but is not limited to, any type of conventional floppy disc, optical discs, CD-ROMs, magneto-optical discs, ROMs, RAMs, EPROMs, EEPROMs, magnetic or optical cards, or any other suitable media for storing electronic instructions.

It is further to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A data input/output management apparatus, comprising:

request reception means for receiving a data input/output request issued from a program along with an identifier for identifying the program;

data input means for entering requested data into the program when the data input/output request received by the request reception means is a data input request;

protected data judgement means for judging whether the data entered by the data input means is a protected data or not;

protected data input recording means for recording at least the identifier for identifying the program, when the data entered by the data input means is judged as the protected data by the protected data judgement means;

output permission judgement means for permitting a data output in a case the identifier for identifying the program is not recorded in the protected data input recording means, and judging whether or not to permit a data output according to at least a requested output target in a case the identifier for identifying the program is recorded in the protected data input recording means, when the data input/output request received by the request reception means is a data output request; and data output means for outputting requested data when the data output is permitted by the output permission judgement means.

2. The apparatus of claim 1, wherein the identifier for identifying the program received by the request receiving means is any one of a program ID, a task ID, and a process ID.

3. The apparatus of claim 1, wherein the protected data judgement means judges the protected data according to a header of each data.

4. The apparatus of claim 1, wherein the output permission judgement means permits the data output when the identifier for identifying the program is recorded in the protected data input recording means and the requested output target is an output device from which another program cannot read data directly.

5. The apparatus of claim 1, wherein the output permission judgement means permits the data output when the identifier for identifying the program is recorded in the protected data input recording means and the requested output target is a display device.

6. The apparatus of claim 1, further comprising:

permitted output target specifying means for specifying output targets to which the data output is to be permitted for a program whose identifier is recorded in the protected data input recording means, such that the output permission judgement means judges whether or not to permit the data output according to the output targets specified by the permitted output target specifying means.

7. The apparatus of claim 6, wherein the permitted output target specifying means specifies the output targets for each protected data, and the protected data input recording means records an ID of each protected data entered by the data input means in correspondence to the identifier for identifying the program, such that the output permission judgement means judges whether or not to permit the data output according to the output targets specified by the permitted output target specifying means for each protected data whose ID is recorded in the protected data input recording means.

8. The apparatus of claim 1, wherein the output permission judgement means also updates the protected data input recording means to record at least an identifier for identifying another program, when the requested output target is said another program.

9. The apparatus of claim 1, wherein the program creates a new program based on the program when a data input of the protected data becomes necessary at the program, such that a data input request for the protected data is received from the new program by the request reception means and the protected data are entered into the new program by the data input means.

10. The apparatus of claim 1, further comprising:
data output request means for requesting a data output from the program without a request from the program; and
wherein the output permission judgement means permits the data output requested by the data output request means when the identifier for identifying the program is not recorded in the protected data input recording means, and does not permit the data output requested by the data output request means when the identifier for identifying the program is recorded in the protected data input recording means.

11. A method for data input/output management, comprising the steps of:
recording at least an identifier for identifying a program in protected data input recording means, when protected data are entered into the program; and
permitting a data output in a case the identifier for identifying the program is not recorded in the protected data input recording means, and judging whether or not to permit a data output according to at least a requested output target in a case the identifier for identifying the program is recorded in the protected data input recording means, in response to a data output request from the program.

12. The method of claim 11, wherein the identifier for identifying the program received at the receiving step is any one of a program ID, a task ID, and a process ID.

13. The method of claim 11, wherein the judging step judges the protected data according to a header of each data.

14. The method of claim 11, wherein the permitting step permits the data output when the identifier for identifying the program is recorded in the protected data input recording means and the requested output target is an output device from which another program cannot read data directly.

15. The method of claim 11, wherein the permitting step permits the data output when the identifier for identifying the program is recorded in the protected data input recording means and the requested output target is a display device.

16. The method of claim 11, further comprising the step of:
specifying output targets to which the data output is to be permitted for a program whose identifier is recorded in the protected data input recording means, such that the permitting step judges whether or not to permit the data output according to the output targets specified at specifying step.

17. The method of claim 16, wherein the specifying step specifies the output targets for each protected data, and the recording step records an ID of each protected data entered at the entering step in correspondence to the identifier for identifying the program in the protected data input recording means, such that the permitting step judges whether or not to permit the data output according to the output targets specified at the specifying step for each protected data whose ID is recorded in the protected data input recording means.

18. The method of claim 11, further comprising the step of:
updating the protected data input recording means to record at least an identifier for identifying another program, when the requested output target is said another program.

19. The method of claim 11, further comprising the step of:
creating a new program based on the program when a data input of the protected data becomes necessary at the program, such that a data input request for the protected data is received from the new program at the receiving step and the protected data are entered into the new program at the entering step.

20. The method of claim 11, further comprising the steps of:
requesting a data output from the program without a request from the program; and
wherein the permitting step permits the data output requested at the requesting step when the identifier for identifying the program is not recorded in the protected data input recording means, and does not permit the data output requested at the requesting step when the identifier for identifying the program is recorded in the protected data input recording means.

21. A writing data management apparatus, comprising:
authentication means for authenticating an application program;
memory means for storing an authentication result obtained by the authentication means in correspondence to an identifier for identifying the application program; and
management means for receiving a request for access to writing data from the application program, and permitting the requested access to the writing data when the authentication result for the application program stored in the memory means indicates a success of the authentication by the authentication means.

22. The apparatus of claim 21, wherein the application program is enciphered by a prescribed cipher key, and the authentication means authenticates the application program by deciphering a prescribed decipher key corresponding to the prescribed cipher key.

23. The apparatus of claim 21, further comprising:
password memory means for storing a proper password for each copyright observant application program for which an access to writing data is to be permitted; and
wherein the authentication means authenticates the application program by verifying a password of the application program against the proper password stored in the password memory means.

24. The apparatus of claim 21, further comprising:
password memory means for storing a plurality of passwords for copyright observant application programs for which an access to writing data is to be permitted along with a proper response corresponding to each password; and
wherein the authentication means authenticates the application program by notifying one of the passwords to the application program, and verifying a response received from the application program against the proper response corresponding to said one of the passwords stored in the password memory means.

25. The apparatus of claim 21, wherein the application program is executed on a first processor in a first hardware, and the authentication means and the memory means are operated on a second processor in a second hardware while the management means is operated on the first processor in the first hardware, where the first and second hardwares are physically separated from each other and the first and second processors are mutually connected with each other.

26. The apparatus of claim 25, wherein the authentication means also authenticates an operating system containing the management means on the first processor when the operating system is activated on the first processor.

27. The apparatus of claim 21, further comprising:
copyright label read/write program means for carrying out read/write operation with respect to copyright labels of the writing data in response to a call from the application program.

28. The apparatus of claim 21, wherein the management means permits the requested access to the writing data even when the authentication result for the application program stored in the memory means does not indicate a success of the authentication by the authentication means as long as the requested access is a read of the writing data.

29. The apparatus of claim 21, wherein the memory means stores information specifying which writing data is accessible from which application program, such that the management means permits an access to writing data requested by the application program according to the information stored in the memory means.

30. The apparatus of claim 21, wherein the authentication means authenticates the application program when the application program is activated.

31. The apparatus of claim 21, wherein the authentication means authenticates the application program when the application program issues the request for access to writing data.

32. A data input/output management apparatus, comprising:
authentication means for authenticating an application program;
memory means for storing an authentication result obtained by the authentication means in correspondence to an identifier for identifying the application program;
request reception means for receiving a data input/output request issued from the application program along with the identifier for identifying the application program;
data input means for entering requested data into the application program when the data input/output request received by the request reception means is a data input request;
protected data judgement means for judging whether the data entered by the data input means is a protected data or not;
protected data input recording means for recording at least the identifier for identifying the application program, when the data entered by the data input means is judged as the protected data by the protected data judgement means;
output permission judgement means for permitting a data output in a case the authentication result for the application program stored in the memory means indicates a success of the authentication by the authentication means and in a case the identifier for identifying the application program is not recorded in the protected data input recording means, and judging whether or not to permit a data output according to at least a requested output target in a case the identifier for identifying the program is recorded in the protected data input recording means, when the data input/output request received by the request reception means is a data output request; and
data output means for outputting requested data when the data output is permitted by the output permission judgement means.

33. A method for writing data management, comprising the steps of:
authenticating an application program;
storing an authentication result obtained at the authenticating step in correspondence to an identifier for identifying the application program, in memory means; and
receiving a request for access to writing data from the application program, and permitting the requested access to the writing data when the authentication result for the application program stored in the memory means indicates a success of the authentication at the authentication step.

34. The method of claim 33, wherein the application program is enciphered by a prescribed cipher key, and the authenticating step authenticates the application program by deciphering a prescribed decipher key corresponding to the prescribed cipher key.

35. The method of claim 33, further comprising the step of:
storing a proper password for each copyright observant application program for which an access to writing data is to be permitted, in password memory means; and
wherein the authenticating step authenticates the application program by verifying a password of the application program against the proper password stored in the password memory means.

36. The method of claim 33, further comprising the step of:
storing a plurality of passwords for copyright observant application programs for which an access to writing data is to be permitted along with a proper response corresponding to each password, in password memory means; and
wherein the authenticating step authenticates the application program by notifying one of the passwords to the application program, and verifying a response received from the application program against the proper response corresponding to said one of the passwords stored in the password memory means.

37. The method of claim 33, wherein the application program is executed on a first processor in a first hardware, and the authenticating step and the storing step are carried out on a second processor in a second hardware while the receiving step is carried out on the first processor in the first hardware, where the first and second hardwares are physically separated from each other and the first and second processors are mutually connected with each other.

38. The method of claim 37, wherein the authenticating step also authenticates an operating system for carrying out the receiving step on the first processor when the operating system is activated on the first processor.

39. The method of claim 33, further comprising the step of:

calling a copyright label read/write program from the application program; and carrying out read/write operation with respect to copyright labels of the writing data by the copyright label read/write program.

40. The method of claim 33, wherein the receiving step permits the requested access to the writing data even when the authentication result for the application program stored in the memory means does not indicate a success of the authentication by the authenticating step as long as the requested access is a read of the writing data.

41. The method of claim 33, wherein the memory means stores information specifying which writing data is accessible from which application program, such that the receiving step permits an access to writing data requested by the application program according to the information stored in the memory means.

42. The method of claim 33, wherein the authenticating step authenticates the application program when the application program is activated.

43. The method of claim 33, wherein the authenticating step authenticates the application program when the application program issues the request for access to writing data.

44. A method for data input/output management, comprising the steps of:

authenticating an application program;

storing an authentication result obtained at the authenticating step in correspondence to an identifier for identifying the application program, in memory means;

recording at least the identifier for identifying the application program in protected data input recording means, when the protected data is entered into the application program; and permitting a data output in a case the authentication result for the application program stored in the memory means indicates a success of the authentication at the authenticating step and in a case the identifier for identifying the application program is not recorded in the protected data input recording means, and judging whether or not to permit a data output according to at least a requested output target in a case the identifier for identifying the program is recorded in the protected data input recording means, in response to a data output request from the application program.

45. An article of manufacture, comprising:

a computer usable medium having computer readable program code means embodied therein for causing a computer to manage data input/output, the computer readable program means including:

first computer readable program code means for causing the computer to judge whether data entered into a program is a protected data or not;

second computer readable program code means for causing the computer to record at least the identifier for identifying the program, when the data entered into the program is judged as the protected data by the first computer readable program code means; and third computer readable program code means for causing the computer to permit a data output from the program in a case the identifier for identifying the program is not recorded by the second computer readable program code means, and to judge whether or not to permit a data output from the program according to at least a requested output target in a case the identifier for identifying the program is recorded by the second computer readable program code means, when a data output request is received from the program.

46. An article of manufacture, comprising:

a computer usable medium having computer readable program code means embodied therein for causing a computer to manage writing data, the computer readable program means including:

first computer readable program code means for causing the computer to authenticate an application program;

second computer readable program code means for causing the computer to store an authentication result obtained by the first computer readable program code means in correspondence to an identifier for identifying the application program; and third computer readable program code means for causing the computer to receive a request for access to writing data from the application program, and to permit the requested access to the writing data when the authentication result for the application program stored by the second computer readable program code means indicates a success of the authentication by the first computer readable program code means.

* * * * *